(12) United States Patent
Ollila

(10) Patent No.: US 11,030,719 B2
(45) Date of Patent: Jun. 8, 2021

(54) IMAGING UNIT, DISPLAY APPARATUS AND METHOD OF DISPLAYING

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 222 days.

(21) Appl. No.: 16/254,099

(22) Filed: Jan. 22, 2019

(65) Prior Publication Data

US 2020/0234407 A1    Jul. 23, 2020

(51) Int. Cl.
*G06T 3/40* (2006.01)
*G06T 5/00* (2006.01)
*H04N 13/383* (2018.01)
*H04N 13/239* (2018.01)
*H04N 13/344* (2018.01)

(52) U.S. Cl.
CPC ............ *G06T 3/4053* (2013.01); *G06T 5/006* (2013.01); *H04N 13/239* (2018.05); *H04N 13/344* (2018.05); *H04N 13/383* (2018.05)

(58) Field of Classification Search
None
See application file for complete search history.

(56) References Cited

U.S. PATENT DOCUMENTS

| 2017/0294006 | A1* | 10/2017 | Cabral | G06T 5/50 |
| 2018/0367769 | A1* | 12/2018 | Greenberg | H04N 9/3129 |
| 2019/0052862 | A1* | 2/2019 | Zhao | G01D 1/00 |
| 2019/0331919 | A1* | 10/2019 | Huo | H04N 13/383 |
| 2020/0051320 | A1* | 2/2020 | Laffont | G06F 3/011 |

\* cited by examiner

*Primary Examiner* — James A Thompson
(74) *Attorney, Agent, or Firm* — Ziegler IP Law Group, LLC

(57) ABSTRACT

A display apparatus includes an imaging unit, an image renderer and a processor. The imaging unit includes a camera for capturing an image of a given real-world scene and an optical element arranged on an optical path of a projection of the given real-world scene. The projection of the given real-world scene is differently magnified by first and second optical-element portions of the optical element in a manner that the captured image has a variable angular resolution across a field of view of the optical element. An angular resolution of a first portion of the captured image is greater than an angular resolution of a second portion of the captured image. The processor is configured to process the captured image to generate an output image and render the output image via the image renderer.

29 Claims, 17 Drawing Sheets

IMAGING UNIT, DISPLAY APPARATUS AND METHOD OF DISPLAYING

TECHNICAL FIELD

The present disclosure relates to imaging units comprising optical elements (for example, such as lenses and/or mirrors) and cameras. Moreover, the present disclosure relates to display apparatuses comprising the aforementioned imaging units. Furthermore, the present disclosure also concerns methods for displaying, via the aforementioned display apparatuses.

BACKGROUND

Simple anamorphic lenses and their use in cinematography are well known. The anamorphic lenses are designed to have an angular resolution in a horizontal direction that is different from an angular resolution in a vertical direction. This enables capturing a widescreen image with a basic 4:3 camera, namely a field of view of a real-world environment that is suitable for cinematography. Notably, the anamorphic lenses provide a constant angular resolution in both vertical and horizontal directions. In other words, the angular resolution is substantially invariant (horizontally as well as vertically) with respect to an angle of view.

FIG. 1A (Prior Art) is a schematic illustration of how an angular resolution of an image captured using a conventional lens 102 and a camera is measured, wherein the angular resolution of the lens 102 is constant along the horizontal and vertical directions; FIG. 1B (Prior Art) is an example graphical representation of an angular resolution of a portion of the image as a function of an angular distance between the portion of the image and a centre of the image; FIG. 10 (Prior Art) is an example graphical representation of the number of pixels employed for capturing a half-angle of view as a function of the half-angle of view; FIGS. 1A-C represent prior art.

With reference to FIG. 1A, a projection of a given real-world scene passes through the lens 102 to be incident upon an image plane 104 of the camera, which then captures the image of the given real-world scene. An optical axis of the lens 102 is denoted by a dashed line O-O', while an optical centre of the lens 102 is denoted by 'P'.

A first object and a second object present in the given real world scene have different angles of view with respect to the lens 102, denoted by an angle 'c1' between rays A and B and an angle 'c2' between rays A' and B', respectively.

With reference to FIG. 1A, when going towards the image plane 104, the rays A and B and the rays A' and B' form angles of view 'd1' and 'd2', respectively. Typically, the angles 'd1' and 'd2' are not equal to the angles 'c1' and 'c2', respectively. A half-angle of view of the first object is denoted by an angle 'e' between the optical axis O-O' and any one of the rays A and B.

With reference to FIG. 1A, the image of the first object is captured on a portion 'h1' of the image plane 104, while the image of the second object is captured on a portion 'h2' of the image plane 104. It will be appreciated that the size of the portions 'h1' and 'h2' can be defined as follows:

Size of $h1 = c1 * Fd$

Size of $h2 = c2 * Fd$ wherein 'Fd' represents a distribution function of image points.

Typically, the angular resolution of the image is defined as the number of pixels per degree (namely, points per degree (PPD)) of an angular width of the field of view of the lens 102. For the conventional lens 102, the angular resolution of the portion 'h1' would be equal to the angular resolution of the portion 'h2', which is also evident from the graphical representation of FIG. 1B.

With reference to FIG. 1A, the centre of the image is a point on the image through which an optical axis O-O' of the lens 102 passes. In FIG. 1A, there are also shown a first portion 'X' and a second portion 'Y' of the image that are at different angular distances from the centre of the image.

The angular resolution of the first portion 'X' is equal to the angular resolution of the second portion 'Y', which is also evident from the graphical representation of FIG. 1B. With reference to FIG. 1B, the angular resolution is constant throughout the field of view of the lens 102.

With reference to FIG. 10, the number of pixels employed for capturing a half-angle of view increases linearly with the half-angle of view.

FIG. 2A (Prior Art) is an example illustration of an image 200 of an array of black and white squares as captured using an imaging device having a conventional lens 202, when said array is placed hemi-spherically around the imaging device (not shown); FIG. 2A represents prior art. The array of black and white squares is placed in a manner that all squares are equidistant from the conventional lens 202. It will be appreciated that, in the captured image 200, each of the black and white squares have a same angular width (in degrees) as measured from an optical centre of the conventional lens 202.

FIG. 2B (Prior Art) is another example illustration of an image 200' of a similar array of black and white squares as captured using the imaging device having the conventional lens 202, when said array is placed on a two-dimensional plane in front of the imaging device; FIG. 2B represents prior art. The array of black and white squares is placed in a manner that squares at a central portion of the captured image 200' are closer to the conventional lens 202 as compared to squares at edges. As shown, the black and white squares at the central portion appear much larger than the squares at the edges.

Conventional lenses have some disadvantages when it comes to implementing them with a Fovea Contingent Display (FCD), which are required to have a higher resolution at a centre of a field of view as compared to edges of the field of view. Typically, the FCD is designed to imitate a physiology of human vision. Conventionally, FCDs have been proposed to be used in head mounted displays (HMD's). Moreover, in order to provide a better user experience, a very large FOV is desirable.

Moreover, a video see-through HMD incorporates at least one camera for capturing an image of a given real-world environment, wherein the image is typically displayed on one display per eye. For a video see-through HMD that incorporates FCD, the number of pixels required for a camera chip is enormous when a conventional lens having a uniform angular resolution is employed. Consequently, the amount of computational resources required for processing and transferring are impractically huge.

In recent times, panomorph lenses have been developed to provide a variable angular resolution in both vertical and horizontal directions. However, such lenses have not been utilized with regard to video see-through HMD's.

Therefore, in light of the foregoing discussion, there exists a need to overcome the aforementioned drawbacks associated with conventional display apparatus and imaging devices.

SUMMARY

The present disclosure seeks to provide a display apparatus. The present disclosure also seeks to provide an imaging unit. The present disclosure further seeks to provide a method of displaying, via the aforementioned display apparatus. The present disclosure seeks to provide a solution to the existing problem of a significant amount of computational resources required to capture, process and transfer images for a focus contingent display. An aim of the present disclosure is to provide a solution that overcomes at least partially the problems encountered in the prior art, and that provides a reliable, fast and efficient imaging unit for use with such display apparatuses.

In a first aspect, an embodiment of the present disclosure provides a display apparatus comprising:
  an imaging unit comprising:
    at least one camera, the at least one camera is to be used to capture an image of a given real-world scene; and
    at least one optical element arranged on an optical path of a projection of the given real-world scene, wherein the at least one optical element comprises a first optical-element portion and a second optical-element portion having different optical properties with respect to magnification, wherein the projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image;
  at least one image renderer; and
  a processor coupled to the at least one camera and the at least one image renderer, wherein the processor is configured to:
    process the captured image of the given real-world scene to generate an output image; and
    render the output image via the at least one image renderer.

In a second aspect, an embodiment of the present disclosure provides an imaging unit comprising:
  at least one camera, the at least one camera is to be used to capture an image of a given real-world scene; and
  at least one optical element arranged on an optical path of a projection of the given real-world scene, wherein the at least one optical element comprises a first optical-element portion and a second optical-element portion having different optical properties with respect to magnification,
  wherein the projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image.

In a third aspect, an embodiment of the present disclosure provides a method of displaying, via a display apparatus comprising an imaging unit and at least one image renderer, the imaging unit comprising at least one camera and at least one optical element, the at least one optical element comprising a first optical-element portion and a second optical-element portion having different optical properties with respect to magnification, the method comprising:
  capturing, via the at least one camera, an image of a given real-world scene, wherein a projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image;
  processing the captured image of the given real-world scene to generate an output image; and
  rendering the output image via the at least one image renderer.

Embodiments of the present disclosure substantially eliminate or at least partially address the aforementioned problems in the prior art, and facilitate capturing images with a variable angular resolution.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 11A is a schematic illustration of an example implementation where a symmetrical optical element is rotated with respect to a camera, while

FIG. 12A is a schematic illustration of another example implementation where an asymmetrical optical element is rotated with respect to a camera, while

Figure 1A:
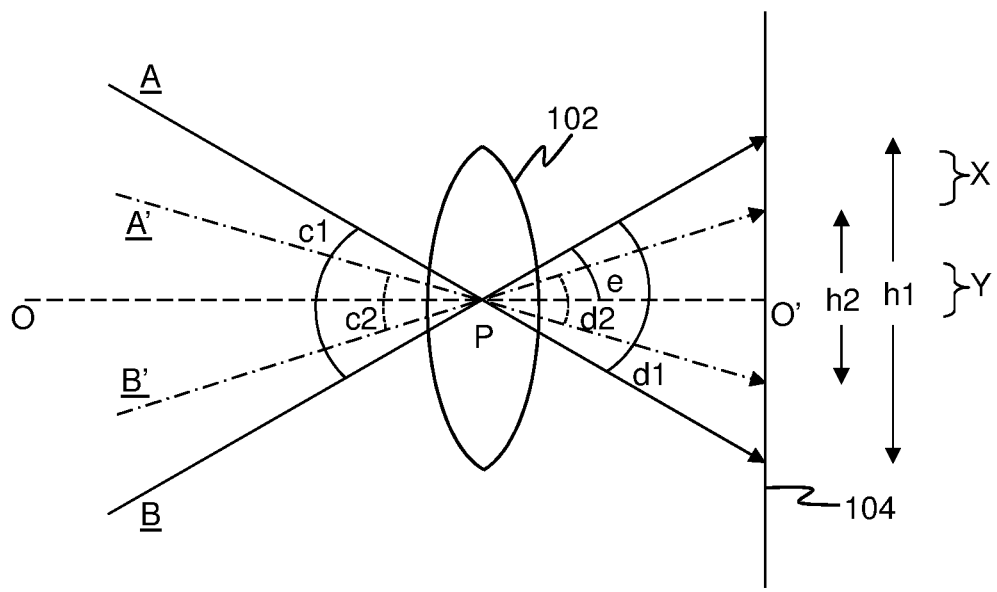
FIG. 1A (Prior Art) is a schematic illustration of how an angular resolution of an image captured using a lens and a camera is measured.
Figure 1B:
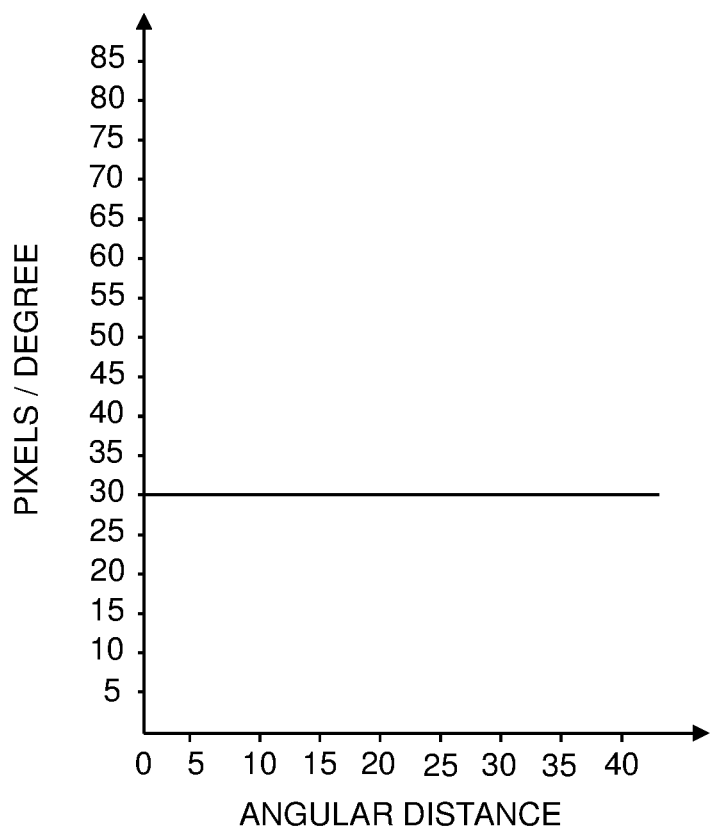
FIG. 1B (Prior Art) is an example graphical representation of an angular resolution of a portion of an image as a function of an angular distance between the portion of the image and a centre of the image, the image being captured using a conventional lens.
Figure 1C:
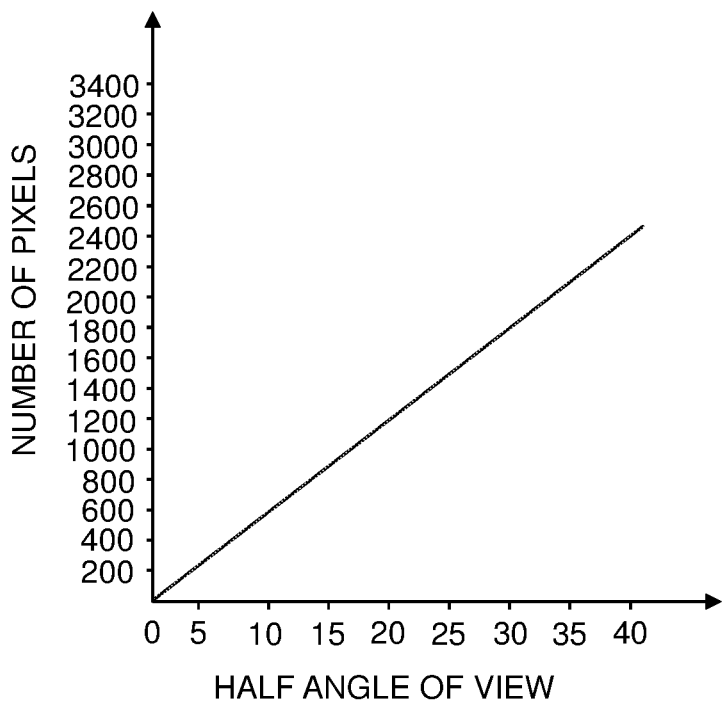
FIG. 1C (Prior Art) is an example graphical representation of the number of pixels employed for capturing a half-angle of view as a function of the half-angle of view.
Figure 2A:
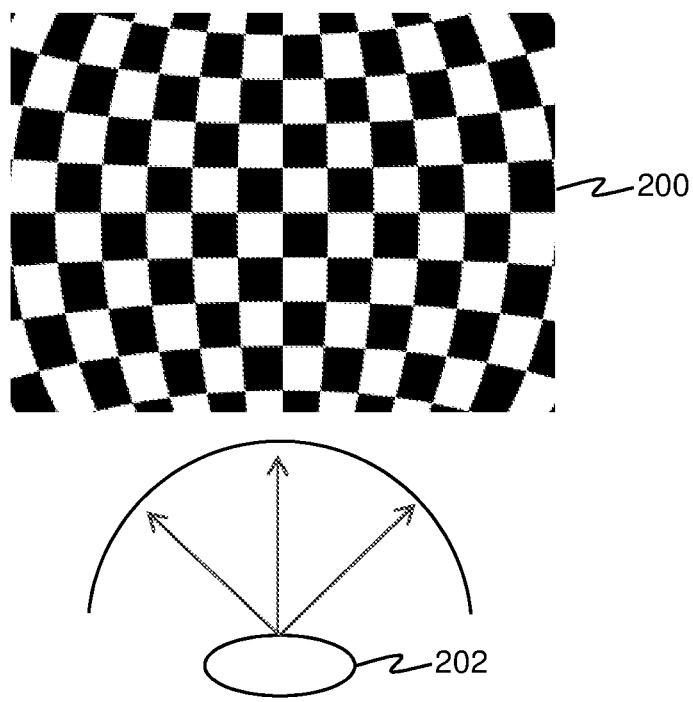
FIG. 2A (Prior Art) is an example illustration of an image of an array of black and white squares as captured using an imaging device having a conventional lens, when said array is placed hemi-spherically around the imaging device.
Figure 2B:
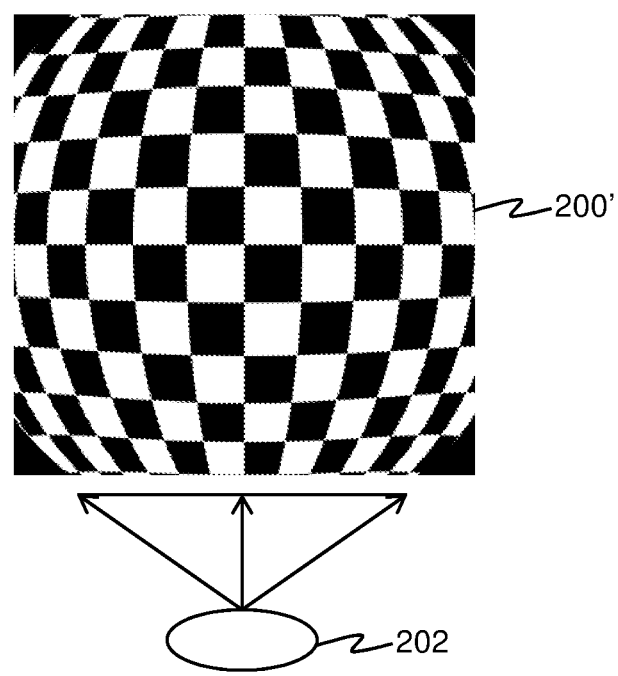
FIG. 2B (Prior Art) is another example illustration of an image of a similar array of black and white squares as captured using the imaging device, when said array is placed on a two-dimensional plane in front of the imaging device.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display apparatus comprising:
an imaging unit comprising:
at least one camera, the at least one camera is to be used to capture an image of a given real-world scene; and
at least one optical element arranged on an optical path of a projection of the given real-world scene, wherein the at least one optical element comprises a first optical-element portion and a second optical-element portion having different optical properties with respect to magnification, wherein the projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image;
at least one image renderer; and
a processor coupled to the at least one camera and the at least one image renderer, wherein the processor is configured to:
process the captured image of the given real-world scene to generate an output image; and
render the output image via the at least one image renderer.

The aforementioned imaging unit allows for capturing the image of the given real-world scene with a variable angular resolution, without a need for any modification in a camera chip of the at least one camera. Beneficially, the output image rendered via the aforementioned display apparatus provides high image resolution at a first portion of the output image that is comparable to a normal human-eye resolution. This greatly increases a user's immersion in the output image (namely, an augmented-reality image) rendered via the display apparatus in operation.

Throughout the present disclosure, the term "field of view of the at least one optical element" refers to an angular extent of the given real-world scene whose projection can pass through or reflect from the at least one optical element, so as to be captured by the at least one camera. It will be appreciated that a projection of a first region of the given real-world scene would pass through or reflect from the first optical-element portion, while a projection of a second region of the given real-world scene would pass through or reflect from the second optical-element portion. As the first and second optical-element portions have different optical properties with respect to magnification, the projections of the first and second regions of the given real-world scene are differently magnified. Hereinafter, the term "optical properties with respect to magnification" is interchangeably referred to as the "magnification properties" for the sake of convenience only.

Throughout the present disclosure, the phrase "differently magnified" has been used to mean any of the following:
(i) the projection of the first region of the given real-world scene is magnified more than the projection of the second region of the given real-world scene,
(ii) the projection of the first region is magnified, whereas the projection of the second region is not magnified at all, or
(iii) the projection of the first region is magnified, whereas the projection of the second region is de-magnified.

Optionally, the at least one camera comprises the camera chip, wherein the first region of the given real-world scene is projected by the first optical-element portion onto the camera chip to form the first portion of the captured image, while the second region of the given real-world scene is projected by the second optical-element portion onto the camera chip to form the second portion of the captured image. An angular width of the first region of the given real-world scene lies in a range of 5 degrees to 60 degrees, while an angular width of the second region of the given real-world scene lies in a range of 40 degrees to 220 degrees. Throughout the present disclosure, the term "angular width" refers to an angular width of a given region of the given real-world scene as seen from an optical centre of the at least one optical element. It will be appreciated that the angular width of the second region of the given real-world scene is larger than the angular width of the first region of the given real-world scene. The angular width of the second region of the given real-world scene may, for example, be 40, 50, 60, 70, 80, 90, 100, 110, 120, 130, 140, 150, 160, 170, 180, 190, 200, 210 or 220 degrees, or any other intermediate value. Likewise, the angular width of the first region of the given real-world scene may, for example, be 5, 10, 15, 20, 25, 30, 35, 40, 45, 50, 55 or 60 degrees, or any other intermediate value.

As the projections of the first and second regions of the given real-world scene are differently magnified, the captured image has a variable angular resolution across the field of view of the at least one optical element. Throughout the present disclosure, the term "angular resolution" refers to the number of pixels per degree (namely, points per degree (PPD)) of an angular width of the field of view of the at least one optical element. It will be appreciated that the term "angular resolution" has been defined in conjunction with FIG. 1A in the Background section of the present disclosure.

According to an embodiment, the at least one optical element is asymmetrical with respect to its optical axis. Optionally, in such a case, the first optical-element portion and the second optical-element portion are positioned asymmetrically with respect to the optical axis of the at least one optical element. More details of such an asymmetrical optical element have been provided later.

According to another embodiment, the at least one optical element is symmetrical with respect to its optical axis. Optionally, in such a case, the first optical-element portion substantially surrounds the optical centre of the at least one optical element, while the second optical-element portion substantially surrounds the first optical-element portion, and is substantially surrounded by a periphery of the at least one optical element.

Optionally, when the at least one optical element is symmetrical with respect to its optical axis, an angular resolution of a portion of the captured image varies as a function of an angular distance between the portion of the captured image and a centre of the captured image, wherein the centre of the captured image is a point on the captured image through which an optical axis of the at least one camera passes. Optionally, in such a case, the angular resolution is the maximum at the centre of the captured image. Optionally, the angular resolution of the captured image decreases linearly on going from its centre towards an edge of the captured image. Alternatively, optionally, the angular resolution of the captured image decreases non-linearly on going from its centre towards its edge. Yet alternatively, optionally, the angular resolution of the captured image decreases in a step-wise manner (namely, abruptly) on going from its centre towards its edge.

Notably, the angular resolution of the first portion of the captured image is greater than the angular resolution of the second portion of the captured image, because the projection of the first region of the given real-world scene (that is captured as the first portion of the captured image) is magnified to a greater extent as compared to the projection of the second region of the given real-world scene (that is captured as the second portion of the captured image). In other words, the number of pixels employed for capturing a particular angular width (namely, the PPD) of the first region of the given real-world scene is greater than the number of pixels employed for capturing that particular angular width (namely, the PPD) of the second region of the given real-world scene.

Moreover, according to an embodiment, the angular resolution of the first portion of the captured image is greater than or equal to twice the angular resolution of the second portion of the captured image. In this embodiment, the number of pixels employed for capturing a particular angular width of the first region of the given real-world scene is greater than or equal to twice the number of pixels employed for capturing that particular angular width of the second region of the given real-world scene. As an example, if the particular angular width of the first and second regions of the given real-world scene were captured using 'M' and 'N' number of pixels, respectively, then 'M' would be greater than or equal to twice of 'N' (namely, M>=2N).

Pursuant to embodiments of the present disclosure, the at least one optical element beneficially enables the display apparatus to substantially mimic human vision. Optionally, in some implementations, the angular resolution of the first portion of the captured image is greater than or equal to six times the angular resolution of the second portion of the captured image. For example, the angular resolution of the first portion may be approximately 90 pixels/degree, while the angular resolution of the second portion may be approximately 15 pixels/degree. More optionally, in other implementations, the angular resolution of the first portion of the captured image is greater than or equal to ten times the angular resolution of the second portion of the captured image. As an example, the angular resolution of the first portion may be approximately 100 pixels/degree, while the angular resolution of the second portion may be approximately 10 pixels/degree.

Optionally, the at least one optical element further comprises at least one intermediary optical-element portion between the first optical-element portion and the second optical-element portion, wherein the at least one intermediary optical-element portion has different optical properties with respect to magnification as compared to the first optical-element portion and the second optical-element portion. Notably, the at least one intermediary optical-element portion could comprise a single intermediary optical-element portion or a plurality of intermediary optical-element portions. Throughout the present disclosure, the term "intermediary optical-element portion" refers to a portion of the at least one optical element that lies between the first optical-element portion and the second optical-element portion. In other words, an intermediary optical-element portion is a portion of the at least one optical element that substantially surrounds the first optical-element portion, and is substantially surrounded by the second optical-element portion.

By the phrase "different optical properties with respect to magnification", it is meant that the first optical-element portion and the second optical-element portion, and optionally, the at least one intermediary portion have different magnification and/or de-magnification properties, and are capable of selectively magnifying and optionally, de-magnifying different portions of the projection of the given real-world scene. Pursuant to an embodiment, the first optical-element portion has a magnification power that is greater than a magnification power of the second optical-element portion.

In one implementation, the at least one intermediary optical-element portion has a magnification power that is greater than a magnification power of the second optical-element portion, but smaller than a magnification power of the first optical-element portion. In another implementation, the at least one intermediary optical-element portion has a magnification power that is smaller than the magnification power of the first optical-element portion, while the second optical-element portion has no magnification power at all. In yet another implementation, the first optical-element portion has a high magnification power, the at least one intermediary optical-element portion has a small magnification power or no magnification power at all, while the second optical-element portion has a de-magnification power.

Throughout the present disclosure, the term "magnification power" refers to an extent to which a region of the given real-world scene appears enlarged when viewed through a given portion of the at least one optical element, while the term "de-magnification power" refers to an extent to which a region of the given real-world scene appears shrunk when viewed through a given portion of the at least one optical element.

For illustration purposes only, there will now be considered an example implementation where the first optical-element portion has a magnification power of 2X, resulting into 200% magnification of the projection of the given real-world scene passing therethrough or reflecting therefrom, while the second optical-element portion has no magnification power at all. There will now be considered a first object and a second object that are present in the given real-world scene and that have an actual angular width of 10 degrees each (as measured from an optical centre of the first optical-element portion), wherein a projection of the first object and a projection of the second object were to pass through or reflect from the first optical-element portion and the second optical-element portion, respectively. Upon passing through or reflecting from the first optical-element portion, the projection of the first object would be magnified by 200%, resulting in an apparent angular width of 30 degrees. On the other hand, upon passing through or reflecting from the second optical-element portion, the projection of the second object would still have an angular width of 10 degrees.

Moreover, the different optical properties (namely, the magnification properties) of the different optical-element portions are dependent on their curvature and focal length. Notably, for a simple magnifying lens, its magnification power is directly proportional to its curvature, and therefore, is inversely proportional to its focal length. In other words, if a given optical-element portion of the at least one optical element is highly curved (namely, has a small radius of curvature), the focal length of the given optical-element portion is small. Consequently, the magnification power of the given optical-element portion would be high. As an example, the curvature of the at least one intermediary optical-element portion may be greater than the curvature of the second optical-element portion, but smaller than the curvature of the first optical-element portion.

Optionally, the magnification power (and optionally, the de-magnification power) of the aforementioned optical-element portions of the at least one optical element is to vary from the optical centre of the first optical-element portion towards an edge of the at least one optical element according to a spatial transfer function. In such a case, the magnification power of the first optical-element portion, the at least one intermediary portion and the second optical-element portion do not change abruptly as discrete values, rather they change smoothly according to the spatial transfer function.

When the at least one optical element is symmetrical with respect to its optical axis, the optical centre of the first optical-element portion corresponds to the centre of the at least one optical element. It will be appreciated that the edge of the at least one optical element corresponds to the periphery of the at least one optical element. Optionally, in such a case, the magnification power of the at least one optical element is maximum at its centre, and decreases on going from its centre towards its edge according to the spatial transfer function.

The spatial transfer function defines how the magnification power varies at different portions of the at least one optical element. More optionally, the spatial transfer function is a function of two variables, wherein the two variables correspond to horizontal and vertical coordinates with respect to the optical centre of the first optical-element portion. Optionally, in such a case, the magnification properties of the at least one optical element vary differently in the horizontal and vertical directions. Some examples of the effect of different spatial transfer functions have been provided in conjunction with FIGS. 5A, 5B and 5C.

The spatial transfer function could be a linear gradient function, a non-linear gradient function or a step gradient function. In an example case where the spatial transfer function is a linear gradient function, the magnification power of the at least one optical element would decrease linearly and uniformly on going from the optical centre of the first optical-element portion towards the edge of the at least one optical element. In another example case where the spatial transfer function is a non-linear gradient function, the magnification power of the at least one optical element would decrease non-linearly on going from the optical centre of the first optical-element portion towards the edge of the at least one optical element. In yet another example case where the spatial transfer function is a step gradient function, the magnification power of the at least one optical element would decrease step wise on going from the optical centre of the first optical-element portion towards the edge of the at least one optical element.

Furthermore, optionally, the first optical-element portion and/or the second optical-element portion have a substantially spherical shape or a substantially ellipsoidal shape.

Moreover, optionally, when the at least one optical element is symmetrical with respect to its optical axis, the first optical-element portion and the second optical-element portion are substantially concentric to each other.

Optionally, the shape of the first optical-element portion and/or the second optical-element portion is defined based upon the angular resolution that is required for a given frame rate of the camera chip. As an example, the shape of the optical-element portions can be defined based upon their respective angular resolutions that are required to be read out from the camera chip at, for example, at least 90 frames per second.

More optionally, the shape of the first optical-element portion and/or the second optical-element portion is defined based upon a required aspect ratio of the output image (namely, an aspect ratio that is desired for the output image). In an example, if the aspect ratio of 16:9 is required, the first optical-element portion and/or the second optical-element portion may have a substantially ellipsoidal shape. In another example, if the aspect ratio of 1:1 is required, the first optical-element portion and/or the second optical-element portion may have a substantially spherical shape.

Optionally, when there are one or more intermediary optical-element portions between the first optical-element portion and the second optical-element portion, the shape of such intermediary optical-element portions is substantially similar to the shape of the first optical-element portion and/or the second optical-element portion.

It will be appreciated that the projection of the given real-world scene is significantly distorted via the at least one optical element. As a result, the captured image appears warped (namely, distorted).

According to an embodiment, when processing the captured image, the processor is configured to de-warp (namely, undistort) the captured image to generate the output image, the output image so generated having a variable image resolution. Hereinabove, the terms "de-warping" and "undistorting" generally refer to applying an inverse of a distortion effect caused by the at least one optical element to the captured image to generate the output image that does not appear warped (namely, distorted) to the user. It will be appreciated that in some implementations, when the spatial transfer function is a step gradient function, the captured image is warped in a manner that the first portion of the captured image has a first angular resolution, while the second portion of the captured image has a second angular resolution. In other words, even though the angular resolutions of the first and second portions are different, the angular resolutions do not vary at all or vary only negligibly within a given portion. In such a case, the angular resolution changes abruptly at a boundary region between the first and second portions of the captured image, wherein the boundary region spans a few degrees of angular width (for example, lying in a range of 1 degree to 5 degrees). In such cases, the term "de-warping" and "undistorting" encompass applying the inverse of the distortion effect caused by the at least one optical element to the captured image and optionally, using additional techniques to smoothen the boundary region between the first and second portions of the output image.

When the captured image having a variable angular resolution is de-warped (namely, undistorted) during processing, the output image so generated has a variable image resolution. Throughout the present disclosure, the term "image resolution" refers to a detail an image holds (see reference: http://en.wikipedia.org/wiki/Image_resolution). The image resolution is typically measured as the number of pixel values associated with a given portion of the output image. Pursuant to embodiments of the present disclosure, a first portion of the output image has a higher image resolution than a second portion of the output image, because the first and second portions of the output image are generated from the first and second portions of the captured image, respectively. In other words, the first portion of the output image has a greater number of pixel values associated therewith per unit area as compared to the second portion of the output image. As an example, if the first and second portions of the output image have 'X' and 'Y' pixel values per unit area, 'X' would be greater than 'Y' (namely, X>Y). Pursuant to embodiments of the present disclosure, the first portion of the output image appears to be resolved to a greater detail as compared to the second portion of the output image.

Optionally, the process of de-warping the captured image comprises generating the pixel values of the output image based upon pixel values of the captured image, such that the de-warped first and second portions of the output image are generated correctly from the warped first and second portions of the captured image, respectively (namely, to represent the actual given real-world scene).

Optionally, in this regard, the process of de-warping is performed by employing a suitable computational algorithm that is based upon the different optical properties (namely, the magnification properties) of the different portions of the at least one optical element with respect to magnification. Optionally, the computational algorithm employs a non-linear transformation. Optionally, the computational algorithm employs well-known techniques, for example, such as normalization and interpolation.

As mentioned earlier, when the magnification properties of the at least one optical element vary in a step-wise manner (namely, when the spatial transfer function is a step gradient function), the captured image is warped in a manner that the first and second portions of the captured image have different angular resolutions, which do not vary at all or vary only negligibly within a given portion. Optionally, in such a case, the at least one optical element comprises a flat lens with optical power only in the first optical-element portion. Alternatively, optionally, the at least one optical element comprises a flat lens with a first optical power and a second optical power in the first optical-element portion and the second optical-element portion, respectively. Such optical elements are easy to manufacture.

Optionally, in such a case, the processor is configured to employ at least one image processing function for the captured image, wherein the at least one image processing function comprises edge processing to reduce, for example to minimize, perceived distortion on the boundary region between the first and second portions of the captured image. Thus, the boundary region can be evenly blended with the first and second portions of the captured image, such that there is no abrupt change in the image resolution at a boundary region between the first and second portions of the output image.

Additionally or alternatively, optionally, the imaging unit further comprises at least one secondary camera coupled to the processor, wherein the at least one secondary camera is to be used to capture a secondary image of the given real-world scene, and wherein the processor is configured to process the secondary image along with the aforementioned captured image to generate the output image. Optionally, in this regard, the secondary image is used to blend the boundary region between the first and second portions of the captured image, so as to smoothen the abrupt change in the angular resolutions of the first and second portions of the captured image. Optionally, in such a case, the boundary region of the output image is generated from the secondary image.

In this regard, the at least one secondary camera can be a low-resolution camera, as compared to the at least one camera. Optionally, the angular resolution of the secondary image lies in a range between the angular resolutions of the first and second portions of the captured image. For example, if the angular resolution of the first portion of the captured image is 90 pixels/degree and the angular resolution of the second portion of the captured image is 15 pixels/degree, the angular resolution of the secondary image can be in a range of 30 to 60 pixels/degree.

It will be appreciated that the secondary image of the given real-world scene is beneficially captured from a substantially similar perspective as that of the at least one camera.

It will be appreciated that there may be some cases where a part of the desired FOV is not captured by the at least one camera, for example, if the at least one optical element is translated, tilted and/or rotated with respect to the at least one camera, or if the camera chip of the at least one camera is too small. Optionally, in such cases, when processing the captured image, the processor is configured to derive from the secondary image the part of the FOV that is not captured by the at least one camera, and to merge the part of the FOV derived from the secondary image with the aforementioned captured image.

Furthermore, according to another embodiment, the output image appears warped (namely, distorted), wherein the display apparatus further comprises at least one complimentary optical element arranged on an optical path of the rendered output image to optically de-warp (namely, undistort) the output image. Optionally, the at least one complimentary optical element is implemented by way of a single lens, a single mirror or a configuration of lenses and/or mirrors that is capable of modifying a projection of the rendered output image passing therethrough or reflecting therefrom in a manner that the output image does not appear warped (namely, distorted) to the user. Optionally, in this regard, the at least one complimentary optical element has suitable optical properties that are capable of applying to the rendered output image an optical effect that is an inverse of the distortion effect caused by the at least one optical element.

Optionally, the at least one complimentary optical element comprises a first complementary portion and a second complimentary portion, wherein the optical properties of the first and second complimentary portions substantially complement the optical properties of the first and second optical-element portions of the at least one optical element, respectively. Optionally, when the at least one optical element is symmetrical with respect to its optical axis, the at least one complimentary optical element is also symmetrical with respect to its optical axis. Optionally, in such a case, the first complimentary portion substantially surrounds an optical centre of the at least one complimentary optical element, while the second complimentary portion substantially surrounds the first complimentary portion, and is substantially surrounded by a periphery of the at least one complimentary optical element.

Optionally, the at least one complimentary optical element is implemented by way of any of: a fresnel lens, a Liquid Crystal (LC) lens, or a liquid lens.

Moreover, even when the output image is optically de-warped, the imaging unit optionally comprises the afore-mentioned at least one secondary camera, wherein the processor is configured to process the secondary image along with the aforementioned captured image to generate the output image, as explained above. In such a case, the secondary image could be used to blend the boundary region between the first and second portions of the captured image, so as to smoothen any abrupt change in the angular resolutions of the first and second portions of the captured image. Optionally, in such a case, the boundary region of the output image is generated from the secondary image.

Throughout the present disclosure, the term "imaging unit" refers to a set of equipment configured to capture images of a given real-world environment, wherein the captured images are processed to generate output images to be displayed on the display apparatus. It will be appreciated that these output images are employed to present a visual scene of a simulated environment (for example, such as an augmented reality environment and the like) to the user of the display apparatus, when the display apparatus in operation is worn by the user.

Throughout the present disclosure, the term "display apparatus" refers to specialized equipment that is configured to present the simulated environment to the user when the display apparatus in operation is worn by the user on his/her head. In such an instance, the display apparatus acts as a device (for example, such as an augmented reality headset, a pair of augmented reality glasses, and so forth) that is operable to present the visual scene of the simulated environment to the user.

In one implementation, the imaging unit is integrated with the display apparatus, and is attached to (for example, mounted on) the display apparatus with suitable mechanical and electrical connections to other components of the display apparatus. As an example, the imaging unit could be mounted, for example, on an outer surface of the display apparatus, such that the at least one camera faces the given real-world scene.

It will be appreciated that the imaging unit can alternatively be implemented on a remote device that is separate from the display apparatus. Details of such an implementation have been provided later in conjunction with another aspect of the present disclosure.

Throughout the present disclosure, the term "camera" refers to equipment that is operable to detect and process projections from the given real-world scene, so as to capture the image of the given real-world scene. It will be appreciated that the image of the given real-world scene may be captured from a same perspective or from different perspectives. Optionally, the at least one camera comprises a camera chip, wherein the projections of the given real-world scene are directed by the at least one optical element onto a photosensitive surface of the camera chip, thereby enabling the at least one camera to capture the image of the given real-world scene. Pursuant to embodiments of the present disclosure, the at least one camera is used to capture a sequence of images, which are then processed and displayed to the user via the at least one image renderer. Optionally, the sequence of images is captured at a frame rate that lies in a range of 90 to 120 frames per second. Beneficially, such frame rates facilitate minimum delay in displaying the sequence of images, which may not be perceived by the user's eye. As a result, the user does not feel motion sickness, which often occurs in conventional display apparatuses due to latency.

Optionally, the at least one camera is communicably coupled with the processor by way of wires (namely, in a wired manner). Alternatively, optionally, the at least one camera is communicably coupled with the processor wirelessly (namely, via a wireless interface).

Moreover, optionally, the at least one camera comprises a first camera substantially aligned with a left eye of the user (hereinafter, referred to as the left camera, for the sake of convenience only) and a second camera substantially aligned with a right eye of the user (hereinafter, referred to as the right camera, for the sake of convenience only). In such an instance, the left camera is configured to capture an image of the given real-world scene from a left perspective view of the user (hereinafter, referred to as the left image, for the sake of convenience only), whereas the right camera is configured to capture an image of the given real-world scene from a right perspective view of the user (hereinafter, referred to as the right image, for the sake of convenience only). It will be appreciated that the aforesaid image of the given real-world scene (namely, the image captured by the at least one camera) refers to both the left image captured by the left camera and the right image captured by the right camera. It will also be appreciated that the at least one camera is not limited to a single camera or a pair of cameras, and could include more than two cameras.

It will be appreciated that the field of view (FOV) of the left camera and the FOV of the right camera may be blocked towards the right side and the left side, respectively, due to blockage by an arrangement of hardware elements of the display apparatus. Consequently, a portion of the left image corresponding to the blocked FOV of the left camera (namely, at the right side) appears black, while a portion of the right image corresponding to the blocked FOV of the right camera (namely, at the left side) appears black. However, a part of the right image captures the blocked FOV of the left camera, while a part of the left image captures the blocked FOV of the right camera. Thus, optionally, the processor is configured to merge the aforesaid part of the right image into the left image and to merge the aforesaid part of the left image into the right image.

Furthermore, optionally, the left camera and the right camera are arranged in a manner that optical axes of the left camera and the right camera are directed straight in front of the imaging unit.

Alternatively, optionally, the left camera and the right camera are arranged in a manner that the optical axis of the left camera and the optical axis of the right camera are directed slightly towards the left and the right, respectively. This facilitates an increase in a horizontal FOV of the at least one camera, and alleviates any problems in the design of the at least one optical element, for example, when the at least one optical element has a narrow FOV (or a narrow horizontal FOV). Optionally, the left camera and the right camera are directed towards the left and the right, respectively, by an angle that lies in a range of 1 degree to 15 degrees; the angle being measured with respect to a direction pointing straight in front of the imaging unit. More optionally, the angle lies in a range of 5 degrees to 10 degrees.

Optionally, in such a case, the processor is configured to produce a nose effect in the left and right images. Herein, the term "nose effect" refers to an effect that is produced to mimic a presence of the user's nose on the right side of the left camera and the left side of the right camera. It will be appreciated that the geometry of a person's face limits a field of view that the person can see from his/her eyes in real life. In particular, the person cannot see towards an extreme right with his/her left eye and towards an extreme left with his/her right eye, as his/her nose would be blocking the field of view. Therefore, it is advantageous to arrange the left camera and the right camera to point slightly to the left and the right, respectively, and to produce the nose effect. Beneficially, the nose effect provides the user with a real-like experience.

Moreover, optionally, the left camera and the right camera are arranged in a manner that the optical axis of one of the left and right cameras is directed slightly towards the top, while the optical axis of the other of the left and right cameras is directed slightly towards the bottom. This facilitates an increase in a vertical FOV of the at least one camera, and alleviates any problems in the design of the at least one optical element, for example, when the at least one optical element has a narrow vertical FOV. Optionally, the aforesaid cameras are directed towards the top and the bottom by an angle that lies in a range of 1 degree to 15 degrees; the angle being measured with respect to the direction pointing straight in front of the imaging unit. More optionally, the angle lies in a range of 5 degrees to 10 degrees.

Throughout the present disclosure, the term "at least one optical element" refers to a configuration of one or more optical elements (for example, such as lenses, prisms, mirrors and so forth) that is capable of modifying projections passing therethrough or reflecting therefrom. The at least one optical element is configured to differently magnify the projection of the given real-world scene in a manner that the image so captured has a variable angular resolution across the field of view of the at least one optical element.

Optionally, the at least one optical element is implemented by way of any of: a fresnel lens, an LC lens, or a liquid lens.

Optionally, the at least one optical element is implemented by way of a single lens or mirror having a complex shape. Alternatively, optionally, the at least one optical element is implemented by way of a configuration of multiple lenses and/or mirrors. Optionally, in this regard, the first optical-element portion, the intermediary optical-element portion and the second optical-element portion are implemented by separate optical elements.

When there are multiple lenses and/or mirrors, the imaging unit can be implemented either as a single-axis arrangement or as a folded arrangement. In the folded arrangement, the imaging unit comprises a reflective element (for example, such as a prism or a mirror) that can be employed to bend the optical path of the projection of the given real-world scene. In the folded arrangement, the camera chip and the at least one optical element are arranged in a proximity of the user's eye; as a result, the at least one camera captures a perspective view that is substantially similar to the user's perspective view (namely, a perspective view that the user would see without wearing the display apparatus). This allows the at least one optical element to accurately mimic the human vision.

Figure 13A:
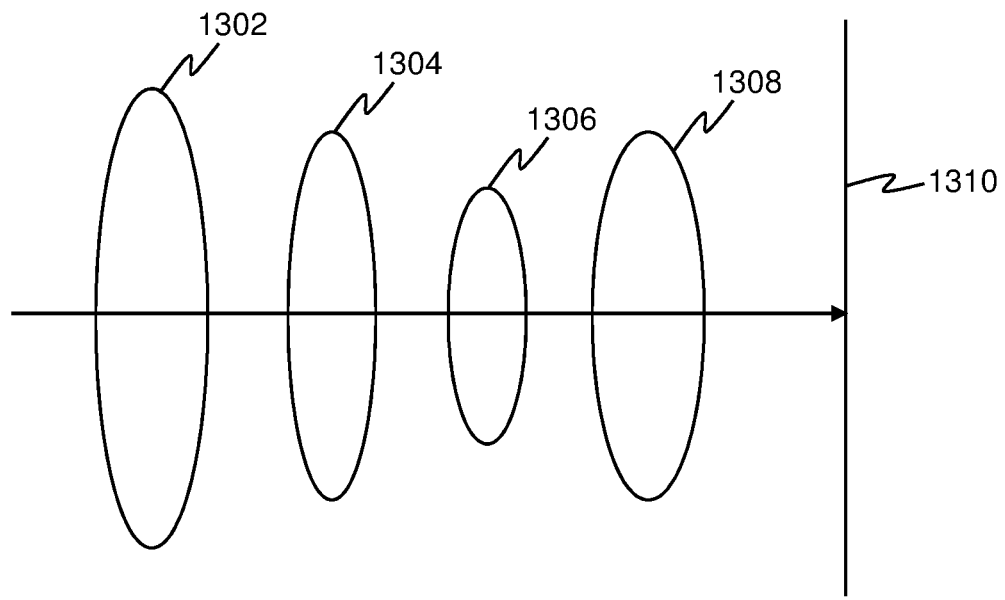
FIGS. 13A and 13B are example arrangements of optical elements used within an imaging unit, in accordance with different embodiments of the present disclosure.
Figure 13B:
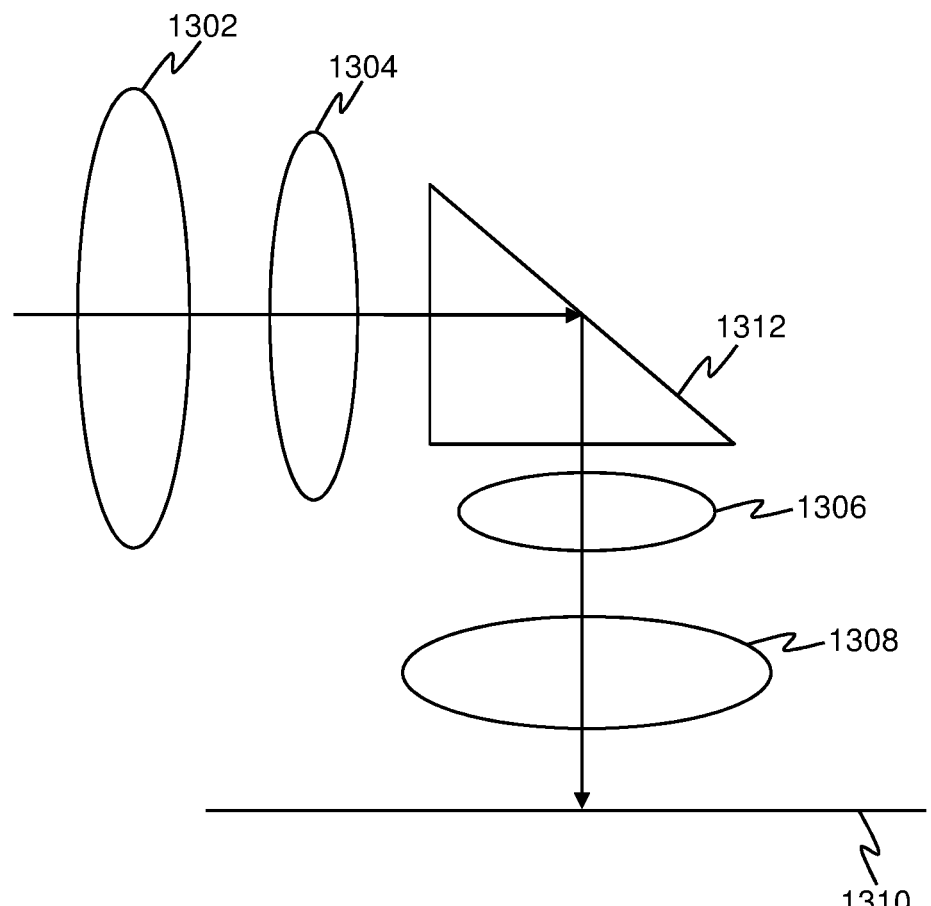

Examples of the single-axis arrangement and the folded arrangement have been provided in conjunction with FIGS. 13A and 13B, respectively.

Optionally, when the at least one camera comprises a plurality of cameras (for example, for the left and right perspective views), the at least one optical element comprises a plurality of optical elements corresponding to the plurality of cameras, wherein each optical element is arranged in front of its corresponding camera.

Throughout the present disclosure, the term "projection of a given region of the given real-world scene" refers to a collection of light rays emanating from the real world and being incident upon the camera chip of the at least one camera. The projection of the given region of the given real-world scene (namely, the collection of light rays) may transmit through and/or reflect from the at least one optical element or its components (for example, such as lenses and/or mirrors) before being incident upon the camera chip of the at least one camera. For purposes of embodiments of the present disclosure, the term "projection of the given region of the given real-world scene" has been used consistently, irrespective of whether the collection of light rays is transmitted and/or reflected.

Furthermore, optionally, when the at least one optical element is symmetrical with respect to its optical axis, the at least one image renderer is implemented by way of a display having different display parts with different display resolutions. More optionally, the display comprises at least a first display part having a first display resolution and a second display part having a second display resolution, wherein the first display resolution is higher than the second display resolution. In such a case, the first display part and the second display part are arranged in a manner that a display area of the first display part is substantially surrounded by a display area of the second display part. Optionally, the processor is configured to render the first and second portions of the output image at the first and second display parts of the aforesaid display, respectively. Such a display can be implemented, for example, as described in a U.S. patent application Ser. No. 16/200,020.

Alternatively, optionally, when the at least one optical element is asymmetrical with respect to its optical axis, the at least one image renderer comprises a first image renderer and a second image renderer. Optionally, in such a case, the first image renderer has a first display resolution, and is used to display the first portion of the output image, while the second image renderer has a second display resolution, and is used to display the second portion of the output image. The first display resolution is higher than the second display resolution, and therefore, is suitable for displaying the first portion of the output image that has a higher image resolution as compared to the second portion of the output image.

Optionally, in such a case, the display apparatus further comprises at least one optical combiner to be employed to optically combine a projection of the first portion of the output image with a projection of the second portion of the output image. Herein, the term "optical combiner" refers to equipment (for example, such as optical elements) for optically combining the projections of the first and second portions of the output image. In operation, the at least one optical combiner optically combines the projections of the first and second portions of the output image to constitute a combined projection, wherein the combined projection is a projection of the output image depicting the visual scene.

Optionally, the at least one optical combiner allows for optically combining the projections of the first and second portions of the output image in a manner that the projection of the first portion is incident upon the fovea of the user's eye, whereas the projection of the second portion is incident upon a remaining region of the retina of the user's eye.

Hereinabove, the term "projection of a given portion of the output image" refers to a collection of light rays emanating from the at least one image renderer when the output image is displayed thereat. The projection of the given portion of the output image (namely, the collection of light rays) may transmit through and/or reflect from various optical elements of the at least one combiner and the display apparatus before reaching the user's eye. For purposes of embodiments of the present disclosure, the term "projection of the given portion of the output image" has been used consistently, irrespective of whether the collection of light rays is transmitted or reflected.

Optionally, the at least one optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, the first image renderer and/or the second image renderer are implemented by way of a display having a same display resolution throughout. Optionally, the display is implemented by way of any of: a Liquid Crystal Display (LCD), a Light Emitting Diode (LED)-based display, an Organic LED (OLED)-based display, a micro OLED-based display, or a Liquid Crystal on Silicon (LCoS)-based display.

Optionally, the first image renderer and/or the second image renderer are implemented by way of a projector and a projection surface associated therewith. Optionally, the projector is implemented by way of any of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, or a laser projector.

Moreover, the processor could be implemented by way of hardware, software, firmware or a combination of these. The processor is configured to control operations of the at least one camera and the at least one image renderer.

Optionally, when processing the captured image, the processor is configured to overlay at least one virtual object on the captured image, so as to generate the output image that represents a stereoscopic image of the given real-world scene having the at least one virtual object. This stereoscopic image of the given real-world scene having the at least one virtual object presents the visual scene of the simulated environment (for example, such as the augmented reality environment), and therefore, can also be referred to as an "augmented-reality image".

Furthermore, optionally, the display apparatus further comprises means for detecting a gaze direction of the user, wherein the gaze direction is to be detected when the display apparatus in operation is worn by the user. Throughout the present disclosure, the term "means for detecting a gaze direction" refers to specialized equipment for detecting and/or following a direction of gaze of the user of the display apparatus, when the user of the display apparatus views the given real-world scene through the at least one image renderer. Optionally, the means for detecting the gaze direction is implemented by way of contact lenses with sensors, cameras monitoring the position of the pupil of the user's eye, and the like. Beneficially, the means for detecting the gaze direction is arranged in a manner that said means do not cause any obstruction in the optical path of the projection of the rendered output image.

Optionally, when processing the captured image, the processor is configured to crop the captured image, based upon the detected gaze direction, to generate the output image. Optionally, in this regard, the processor is configured to determine a region of interest in the given real-world scene (namely, a region of the given real-world scene whereat the gaze of the user's eyes may be focused at a given point of time), based upon the detected gaze direction. In such a case, the output image visually represents the region of interest in the given real-world scene.

Additionally, optionally, the processor is configured to crop the captured image to generate the output image, based upon a displayable field of view of the display apparatus. Optionally, such cropping is performed when the captured image is being read out from the at least one camera, as pixel values falling outside a display area of the at least one image renderer are not required to be processed.

It will be appreciated that the cropping of the captured image is particularly beneficial when the captured image is required to be stored and/or communicated to an external device for further processing, as the cropped image not only requires a smaller storage space, but also a smaller transmission bandwidth. Moreover, the cropping of the captured image saves processing time and power consumption.

For illustration purposes only, there will now be considered an example scenario where the camera chip of the at least one camera comprises an array of 5000*5000 photo-sensing elements for capturing an image with 5000*5000 pixel values. However, the camera chip may be capable of reading out, for example, only 4000*4000 pixel values at a frame rate of 90 frames per second.

In the example, the display area of the at least one image renderer is such that only 3000*3000 pixel values are required. In such a case, only 3000*3000 pixel values would be cropped from the camera chip, while remaining pixel values in a proximity of a periphery of the camera chip would be cropped out.

In the illustrated example, approximately 2000*2000 pixel values, from amongst the 3000*3000 pixel values, correspond to a first portion of the cropped image, while remaining pixel values correspond to a second portion of the cropped image. Assume that the first and second optical-element portions of the at least one optical element have optical properties (namely, magnification properties), such that the 3000*3000 pixel values cover a field of view of 90 degrees, while the 2000*2000 pixel values cover a field of view of 30 degrees. In such a case, the first portion of the cropped image would have an average angular resolution of 66.67 pixels/degree (=2000/30), while the second portion of the cropped image would have an average angular resolution of 16.67 pixels/degree (=(3000-2000)/(90-30)=1000/60). It will be appreciated that the aforementioned angular resolution of the second portion of the cropped image is exemplary and may vary based on the magnification properties of the at least on optical element. For example, the second portion of the cropped image may have an average angular resolution of 10 pixels/degree, wherein the angular resolution decreases towards an edge of the cropped image.

Optionally, when the user's gaze shifts in a particular direction with respect to the optical axis of the at least one camera, the cropping is performed in a manner that pixel values are read out from a portion of the captured image that substantially corresponds to a direction that is opposite to the particular direction. In the illustrated example, there will now be considered that the user shifts his/her gaze towards the left by 15 degrees, and this shift in the gaze direction is detected by said means. In such a case, pixel values to be read out from the camera chip would be selected, based upon the detected gaze direction. In other words, the pixel values that would be read out in this case would not be at the centre of the camera chip, but towards the right by 15 degrees with respect to the optical axis of the at least one camera. It will be appreciated that the imaging unit allows for capturing a wide field of view of the given real-world scene (for example, at least 105 degrees). Thus, when the user shifts his gaze, there is no discontinuity (for example, black edges) in the cropped image.

In another example, there will now be considered that the user shifts his/her gaze towards the top-left by 15 degrees, and this shift in the gaze direction is detected by said means. In such a case, the pixel values that would be read out would not be at the centre of the camera chip, but towards the bottom-right by 15 degrees with respect to the optical axis of the at least one camera.

Figure 9:
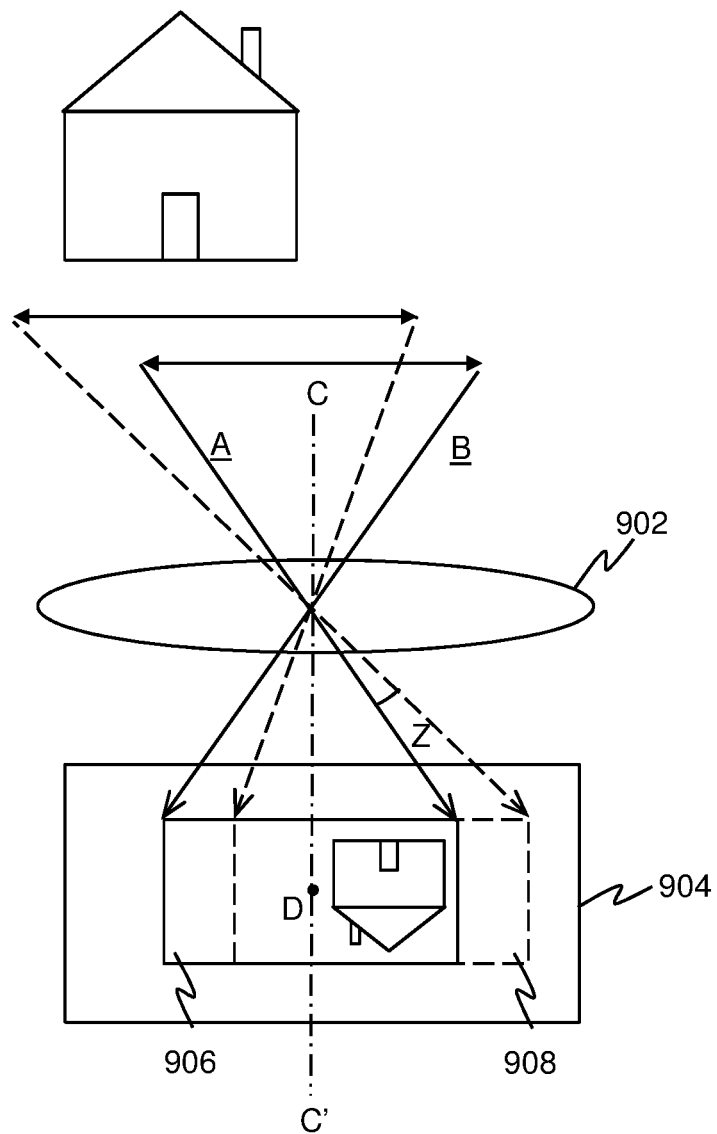
FIG. 9 is a schematic illustration of how a captured image can be cropped to generate an output image, in accordance with an embodiment of the present disclosure.

The aforementioned example has been illustrated in conjunction with FIG. 9, for the sake of clarity.

As mentioned earlier, the magnification properties of the at least one optical element optionally vary differently in the horizontal and vertical directions. It will be appreciated that the angular resolution of the at least one optical element could also vary in an anamorphic manner, because often the angular resolution in the vertical direction has a greater impact on the data rate at which images are being captured (namely, frames per second). In such cases, the angular resolution in the horizontal direction could be as high as the resolution allowed by the camera chip. Optionally, in such a case, the cropping is required only in the vertical direction, namely when the user's gaze shifts up or down. Alternatively, optionally, the data rate at which the images are being captured is a function of the angular resolution in the horizontal direction. Yet alternatively, optionally, the data rate at which the images are being captured is a function of the angular resolutions in the horizontal and vertical directions.

For illustration purposes, there will now be considered an example scenario of a camera chip that has an array of 4000*2000 photo-sensing elements (namely, 4000 pixel values in the horizontal direction and 2000 pixel values in the vertical direction), wherein the cropped image can be read out at 120 frames per second. In such a case, the variable angular resolution in the horizontal direction could cover a horizontal field of view of 60 degrees with respect to the centre of the camera chip, while the variable angular resolution in the vertical direction could cover a vertical field of view of 30 degrees. In such cases, the frame rate would be substantially linearly proportional to the angular resolution in the vertical direction. Notably, in global shutter sensors or sensors with Dynamic Random Access Memory (DRAM), the limitation is not in an Analog-to-Digital Converter (ADC) that reads the array of photo-sensing elements, but in an interface between the at least one camera and the processor of the display apparatus, for example, such as Mobile Industry Processor Interface (MIPI). In such cases, the aspect ratio of the horizontal and vertical directions could lie within a range from 1:1 to 4:3 (or to 16:9).

Moreover, optionally, the display apparatus further comprises at least one first actuator attached to the imaging unit, wherein the processor is configured to control the at least one first actuator to adjust an orientation of the imaging unit, based upon the detected gaze direction. More optionally, the at least one first actuator is configured to displace (horizontally and/or vertically), rotate and/or tilt the imaging unit, based upon the detected gaze direction of the user. Optionally, in this regard, the at least one first actuator is smoothly moveable to change the orientation of the imaging unit in a predefined time duration, based upon the detected gaze direction. For example, the at least one first actuator may move a maximum required distance within a time range of 10 milliseconds to 20 milliseconds. Furthermore, optionally, multiple discrete positions of the at least one first actuator are defined in a manner that multiple possible orientations of the imaging unit can be achieved. For example, the at least one first actuator may have 2 to 10 pre-defined discrete positions.

When the at least one optical element is symmetrical about its optical axis and the first optical-element portion is substantially ellipsoidal in shape, the first portion of the captured image (namely, having greater angular resolution) is substantially elliptical in shape. Thus, in such a case, it is beneficial to rotate the imaging unit based upon the detected gaze direction.

It will be appreciated that a change in the orientation of the imaging unit often results in a change in a perspective from which the imaging unit is viewing the given real-world scene. Beneficially, an accurate detection of the gaze direction enables the display apparatus to closely implement gaze contingency thereon. Optionally, in this regard, the processor is configured to crop the captured image once the orientation of the imaging unit is modified, thereby providing a fully immersive experience to the user by cropping the captured image that has been captured based upon the detected gaze direction.

According to an embodiment, a relative position of the at least one optical element with respect to the at least one camera is fixed.

According to another embodiment, the relative position of the at least one optical element with respect to the at least one camera is adjustable. Optionally, in such a case, the imaging unit further comprises at least one second actuator attached to the at least one optical element, wherein the processor is configured to control the at least one second actuator to rotate the at least one optical element with respect to the at least one camera, based upon the detected gaze direction. In such a case, the position of the at least one camera is fixed, whilst the at least one optical element is rotatable. Moreover, optionally, in such a case, the camera chip of the at least one camera has the same number of pixels in the horizontal and vertical directions.

Optionally, the at least one second actuator is capable of rotating the at least one optical element smoothly. Alternatively, optionally, the at least one second actuator has multiple discrete positions, according to which the relative position of the at least one optical element is adjusted with respect to the at least one camera.

Optionally, the at least one optical element is rotatable in one direction only, namely either clockwise or anti-clockwise. Alternatively, optionally, the at least one optical element is rotatable in both directions.

Additionally, optionally, the at least one second actuator is controlled to tilt and/or translate the at least one optical element with respect to the at least one camera, based upon the detected gaze direction.

It will be appreciated that when the at least one optical element is symmetrical about its optical axis and the first optical-element portion is substantially ellipsoidal in shape, it is beneficial to rotate the at least one optical element based upon the detected gaze direction. Optionally, in such a case, if the at least one optical element is rotatable in only one direction, an angle of rotation of the at least one optical element lies within a range of 0 degrees to 180 degrees; otherwise, if the at least one optical element is rotatable in both the directions, the angle of rotation of the at least one optical element lies within a range of 0 degrees to 90 degrees. One such example implementation has been illustrated in conjunction with FIGS. 10A, 10B, 11A and 11B, as described below. In the example implementation, the camera chip comprises 4000*4000 pixels; at a first position, the first optical-element portion of the at least one optical element covers 20 degrees of the field of view in the vertical direction and 60 degrees of the field of view in the horizontal direction. When the user shifts his/her gaze towards the top (for example, when the user looks up), the at least one second actuator is optionally controlled to rotate the at least one optical element by 90 degrees, so as to move the first optical-element portion to a second position. In this way, the at least one second actuator is controlled, based upon the detected gaze direction, to capture the region of interest with a greater angular resolution.

In other implementations, when the at least one optical element is asymmetrical about its optical axis and the first optical-element portion is positioned asymmetrically with respect to the optical axis of the at least one optical element, it is beneficial to rotate the at least one optical element based upon the detected gaze direction. Optionally, in such a case, if the at least one optical element is rotatable in only one direction, the angle of rotation of the at least one optical element lies within a range from 0 degrees to 360 degrees; otherwise, if the at least one optical element is rotatable in both the directions, the angle of rotation of the at least one optical element lies within a range of 0 degrees to 180 degrees. One such example implementation has been illustrated in conjunction with FIGS. 12A and 12B. The at least one second actuator is controlled, based upon the detected gaze direction, to rotate the at least one optical element to adjust an orientation of the first optical-element portion in a manner that the projection of the region of interest in the given real-world scene passes through or reflects from the first optical-element portion and is captured with a greater angular resolution.

It will be appreciated that the angle of rotation of the at least one optical element is reduced considerably in a case where the at least one optical element is symmetrical as compared to another case where the at least one optical element is asymmetrical. As a result, the at least one second actuator is simpler to implement for a symmetrical optical element as compared to an asymmetrical optical element. Moreover, power consumption of the at least one second actuator also reduces in the case where the at least one optical element is symmetrical.

Optionally, the at least one second actuator is implemented by way of a stepper motor. Optionally, in such a case, the processor is configured to obtain, from the at least one second actuator, information indicative of the angle of rotation, and to take into consideration the information indicative of the angle of rotation when processing the captured image.

It will be appreciated that the optical centre of the at least one optical element may or may not be the same as the centre of rotation. Moreover, it will be appreciated that the at least one optical element is balanced in a manner that the centre of mass of the at least one optical element is at the centre of rotation.

Furthermore, optionally, the processor is configured to control the at least one second actuator to rotate the at least one optical element for a time-variant scanning of the camera chip of the at least one camera.

In a second aspect, an embodiment of the present disclosure provides an imaging unit comprising:
 at least one camera, the at least one camera is to be used to capture an image of a given real-world scene; and
 at least one optical element arranged on an optical path of a projection of the given real-world scene, wherein the at least one optical element comprises a first optical-element portion and a second optical-element portion having different optical properties with respect to magnification,
wherein the projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image.

The present disclosure also relates to the imaging unit as described above. Various embodiments and variants disclosed above, with respect to the aforementioned first aspect, apply mutatis mutandis to the imaging unit.

According to an embodiment, the at least one optical element is asymmetrical with respect to its optical axis. Optionally, in such a case, the first optical-element portion and the second optical-element portion are positioned asymmetrically with respect to the optical axis of the at least one optical element.

According to another embodiment, the at least one optical element is symmetrical with respect to its optical axis. Optionally, in such a case, the first optical-element portion substantially surrounds an optical centre of the at least one optical element, while the second optical-element portion substantially surrounds the first optical-element portion.

Optionally, the angular resolution of the first portion of the captured image is greater than or equal to twice the angular resolution of the second portion of the captured image.

Optionally, the at least one optical element further comprises at least one intermediary optical-element portion between the first optical-element portion and the second optical-element portion, the at least one intermediary optical-element portion having different optical properties with respect to magnification as compared to the first optical-element portion and the second optical-element portion.

Optionally, the magnification power (and optionally, the de-magnification power) of the aforementioned optical-element portions of the at least one optical element is to vary from an optical centre of the first optical-element portion towards an edge of the at least one optical element according to a spatial transfer function, as described earlier.

Optionally, the first optical-element portion and/or the second optical-element portion have a substantially spherical shape or a substantially ellipsoidal shape.

Optionally, the at least one camera comprises a camera chip, wherein a first region of the given real-world scene is projected by the first optical-element portion onto the camera chip to form the first portion of the captured image, while a second region of the given real-world scene is projected by the second optical-element portion onto the camera chip to form the second portion of the captured image. An angular width of the first region of the given real-world scene lies in a range of 5 degrees to 60 degrees, while an angular width of the second region of the given real-world scene lies in a range of 40 degrees to 220 degrees.

In one implementation, the imaging unit is integrated with a display apparatus, for example, as described in conjunction with the aforementioned first aspect.

In another implementation, the imaging unit is implemented on a remote device that is separate from a display apparatus. Optionally, the imaging unit is mounted on the remote device. Examples of the remote device include, but are not limited to, a drone and a robot.

In such an instance, the remote device is physically positioned at the given real-world environment, whereas the user of the display apparatus is positioned away from (for example, at a distance from) the remote device. In such an implementation, the imaging unit and the display apparatus are communicably coupled via a wired interface or a wireless interface.

Optionally, in this implementation, the display apparatus comprises means for tracking a head orientation of a user, wherein the head orientation is to be tracked when the display apparatus in operation is worn by the user. Throughout, the present disclosure, the term "means for tracking a head orientation" refers to specialized equipment for detecting and optionally, following the orientation of the user's head, when the display apparatus is worn by the user. Optionally, the means for tracking the head orientation of the user is implemented by way of a gyroscope and an accelerometer.

Optionally, in this regard, the imaging unit further comprises:
  at least one actuator attached to a base that supports the at least one optical element and the at least one camera; and
  a processor coupled to the at least one camera and the at least one actuator, wherein the processor is configured to:
    receive, from the display apparatus, information indicative of the current head orientation and gaze direction of the user; and
    control the at least one actuator to adjust an orientation of the at least one optical element and the at least one camera, based upon the current head orientation and gaze direction of the user.

A visual scene so presented to the user conforms to a current perspective of the user. This provides a greater sense of immersion to the user.

In a third aspect, an embodiment of the present disclosure provides a method of displaying, via a display apparatus comprising an imaging unit and at least one image renderer, the imaging unit comprising at least one camera and at least one optical element, the at least one optical element comprising a first optical-element portion and a second optical-element portion having different optical properties with respect to magnification, the method comprising:
  capturing, via the at least one camera, an image of a given real-world scene, wherein a projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image;
  processing the captured image of the given real-world scene to generate an output image; and
  rendering the output image via the at least one image renderer.

The present disclosure also relates to the method as described above. Various embodiments and variants disclosed above, with respect to the aforementioned first and second aspects, apply mutatis mutandis to the method.

Optionally, in the method, the captured image appears warped, wherein the step of processing of the captured image comprises de-warping the captured image to generate the output image, the output image so generated having a variable image resolution.

Optionally, in the method, the output image appears warped, wherein the display apparatus further comprises at least one complimentary optical element arranged on an optical path of the rendered output image to optically de-warp the output image.

Optionally, the imaging unit further comprises at least one secondary camera, wherein the method further comprises:
  capturing, via the at least one secondary camera, a secondary image of the given real-world scene; and
  processing the secondary image along with the captured image to generate the output image, the secondary image being used to blend a boundary region between the first and second portions of the captured image.

Optionally, in the method, the display apparatus further comprises means for detecting the gaze direction of the user, the gaze direction being detected when the display apparatus is in operation is worn by the user. Optionally, the step of processing the captured image comprises cropping the captured image, based upon the detected gaze direction, to generate the output image.

Optionally, in the method, the display apparatus further comprises at least one first actuator attached to the imaging unit, wherein the method further comprises controlling the at least one first actuator to adjust an orientation of the imaging unit, based upon the detected gaze direction.

Optionally, in the method, the imaging unit further comprises at least one second actuator attached to the at least one optical element, wherein the method further comprises controlling the at least one second actuator to rotate the at least one optical element with respect to the at least one camera, based upon the detected gaze direction.

Moreover, optionally, the method further comprises controlling the at least one second actuator to rotate the at least one optical element for a time-variant scanning of a camera chip of the at least one camera.

DETAILED DESCRIPTION OF THE DRAWINGS

Figure 3:
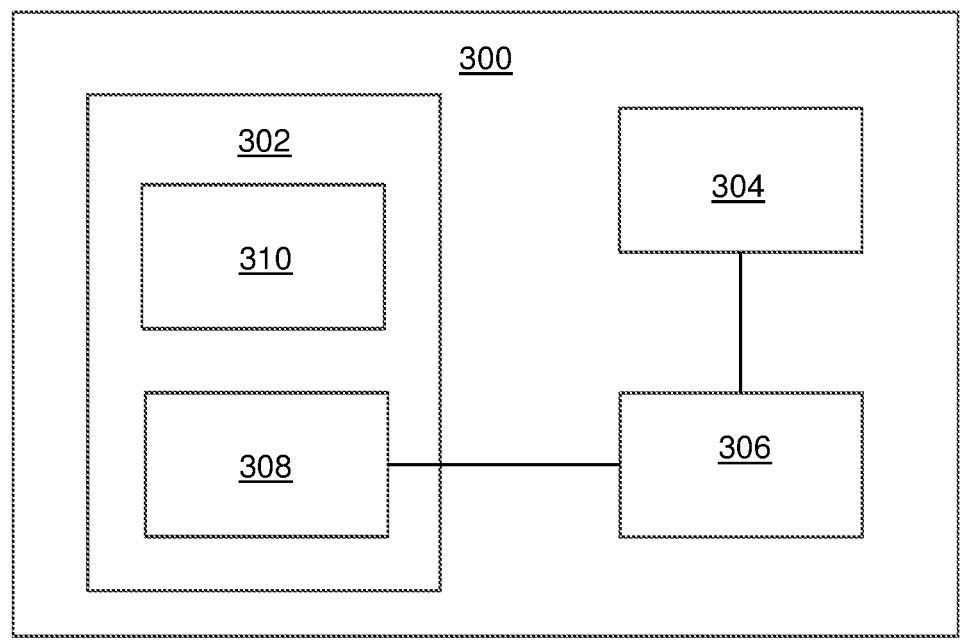
FIG. 3 is a block diagram of a high-level architecture of a display apparatus, in accordance with an embodiment of the present disclosure.

Referring to FIG. 3, illustrated is a block diagram of a high-level architecture of a display apparatus 300, in accordance with an embodiment of the present disclosure. The display apparatus 300 comprises an imaging unit 302, at least one image renderer (depicted as an image renderer 304) and a processor 306. The imaging unit 302 comprises at least one camera (depicted as a camera 308) and at least one optical element (depicted as an optical element 310). The processor 306 is coupled to the camera 308 and the image renderer 304.

FIG. 3 is merely an example, which should not unduly limit the scope of the claims herein. It is to be understood that the specific designation for the display apparatus 300 is provided as an example and is not to be construed as limiting the display apparatus 300 to specific numbers or types of cameras, optical elements, image renderers and processors. A person skilled in the art will recognize many variations, alternatives, and modifications of embodiments of the present disclosure.

Figure 4:
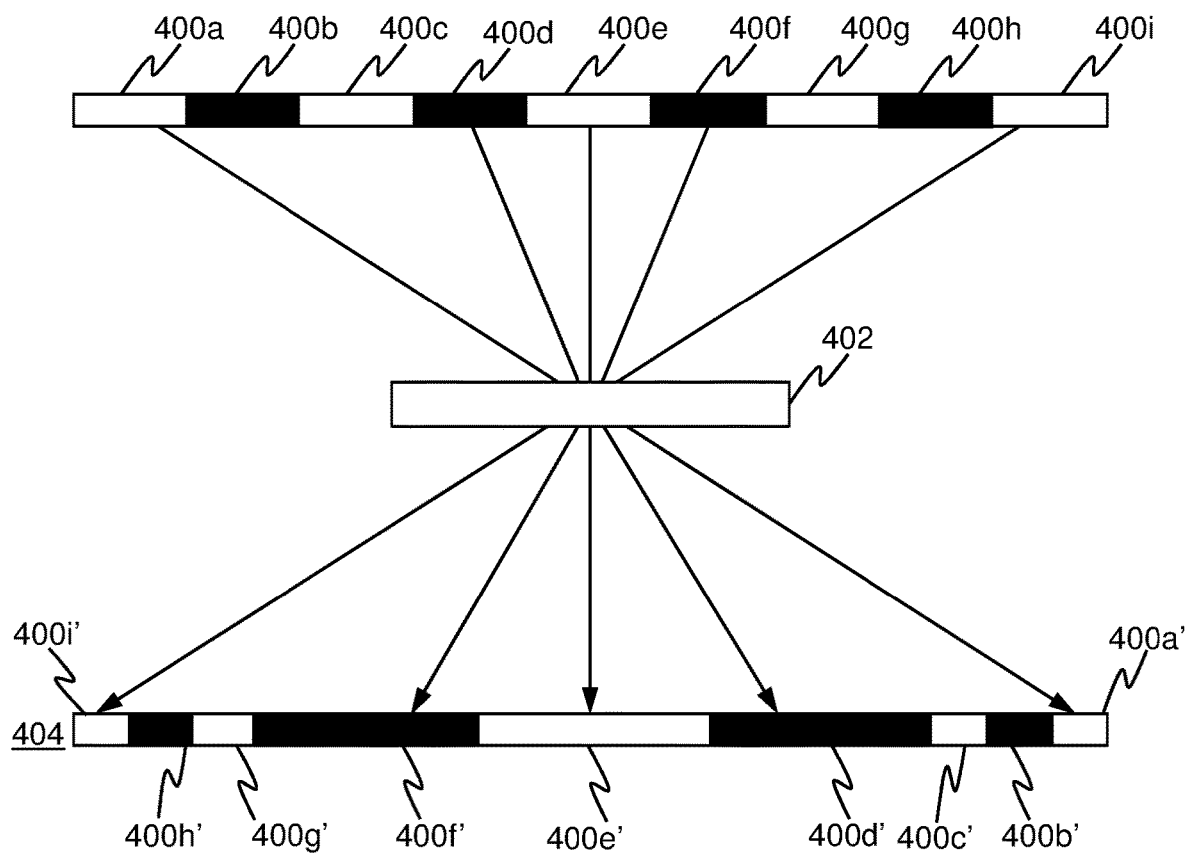
FIG. 4 is a schematic illustration of how different regions of a projection of a given real-world scene are differently magnified, in accordance with an embodiment of the present disclosure.

FIG. 4 is a schematic illustration of how different regions 400*a-i* of a projection of a given real-world scene are differently magnified by at least one optical element 402, in accordance with an embodiment of the present disclosure. There are shown different regions 400*a*, 400*b*, 400*c*, 400*d*, 400*e*, 400*f*, 400*g*, 400*h* and 400*i* of the projection of the given real-world scene, wherein the regions 400*d*, 400*e* and 400*f* collectively constitute a first region of the projection of the given real-world scene, while the regions 400*a*, 400*b*, 400*c*, 400*g*, 400*h* and 400*i* collectively constitute a second region of the projection of the given real-world scene. Upon passing through or reflecting from the at least one optical element 402, the different regions 400*a*, 400*b*, 400*c*, 400*d*, 400*e*, 400*f*, 400*g*, 400*h* and 400*i* are differently magnified, and are captured on an image plane 404 of a camera as image portions 400*a'*, 400*b'*, 400*c'*, 400*d'*, 400*e'*, 400*f'*, 400*g'*, 400*h'* and 400*i'*, respectively. Notably, the regions 400*d*, 400*e*, and 400*f* are magnified, while the regions 400*a*, 400*b*, 400*c*, 400*g*, 400*h* and 400*i* are de-magnified.

FIG. 4 is merely an example, which should not unduly limit the scope of the claims herein. A person skilled in the art will recognize many variations, alternatives, and modifications of embodiments of the present disclosure. For example, some regions of the projection of the given real-world scene may be neither magnified nor de-magnified.

Figure 5A:
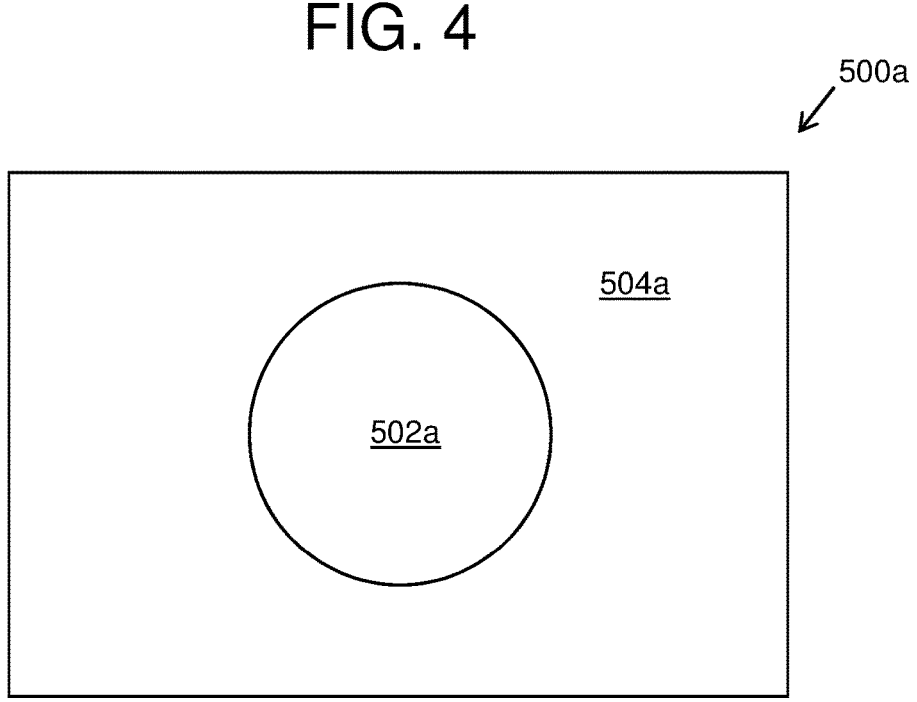
FIGS. 5A, 5B and 5C are example schematic illustrations of portions of captured images having different angular resolutions, in accordance with different embodiments of the present disclosure.
Figure 5B:
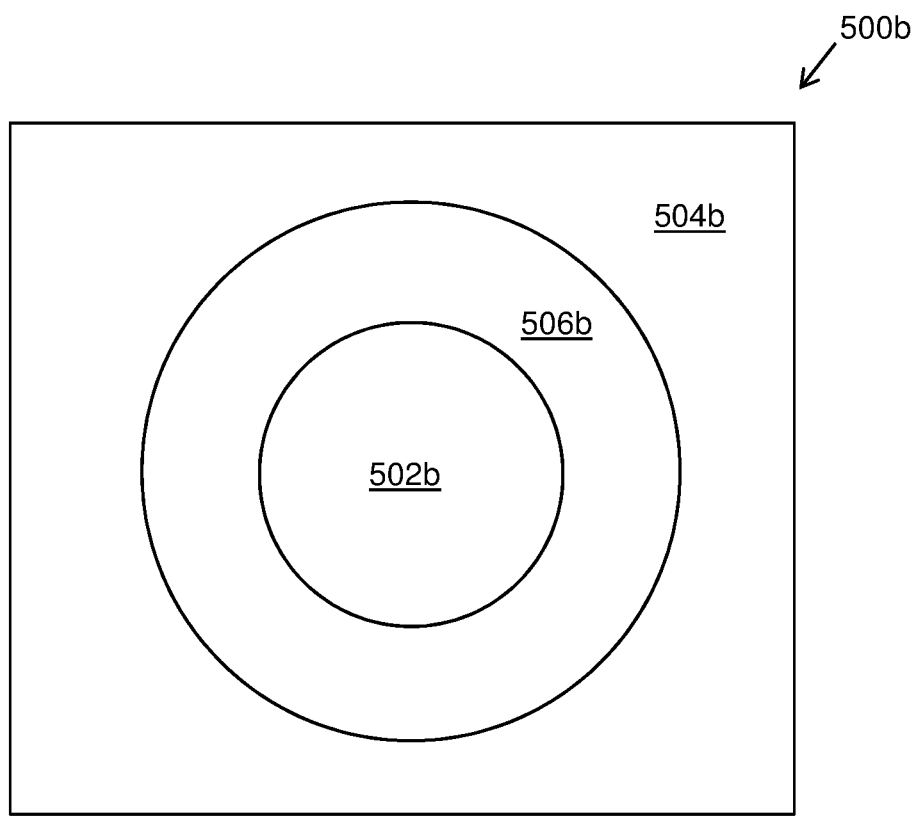
Figure 5C:
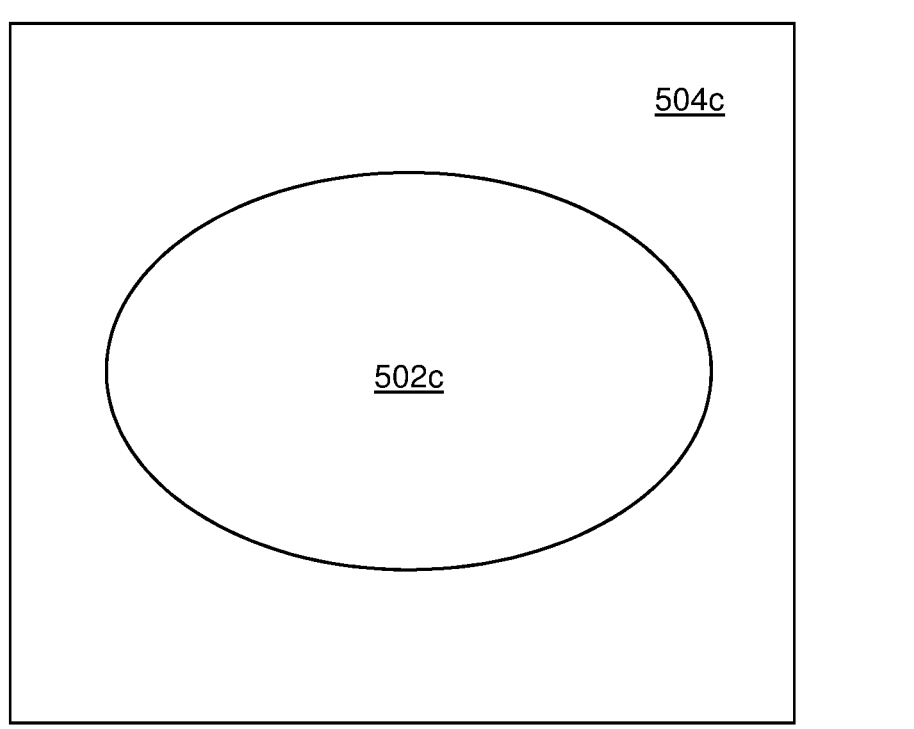

Referring to FIGS. 5A, 5B and 5C, illustrated are example schematic illustrations of portions of captured images having different angular resolutions, in accordance with different embodiments of the present disclosure.

With reference to FIG. 5A, a captured image 500*a* comprises a first portion 502*a* and a second portion 504*a*. The angular resolution of the first portion 502*a* is greater than an angular resolution of the second portion 504*a*, pursuant to embodiments of the present disclosure. As shown, the shape of the first portion 502*a* is substantially circular, pursuant to an embodiment of the present disclosure. As a result, the angular resolution of a given portion of the captured image 500*a* (measured as a function of an angular distance between the given portion of the captured image 500*a* and a centre of the captured image 500*a*) would vary substantially similarly in different directions (for example, horizontal and vertical directions).

With reference to FIG. 5B, a captured image 500*b* comprises a first portion 502*b*, a second portion 504*b* and an intermediary portion 506*b* between the first portion 502*a* and the second portion 504*b*. The angular resolution of the intermediary portion 506*b* is greater than the angular resolution of the second region 504*b*, but smaller than the angular resolution of the first region 502*b*. As shown, the shape of the first portion 502*b* and the intermediary portion 506*b* is substantially circular, pursuant to an embodiment of the present disclosure. As a result, the angular resolution of a given portion of the captured image 500*b* (measured as a function of an angular distance between the given portion of the captured image 500*b* and a centre of the captured image 500*b*) would vary substantially similarly in different directions (for example, the horizontal and vertical directions).

With reference to FIG. 5C, a captured image 500*c* comprises a first portion 502*c* and a second portion 504*c*. The angular resolution of the first portion 502*c* is greater than the angular resolution of the second portion 504*c*. As shown, the shape of the first portion 502*c* is substantially elliptical, pursuant to another embodiment of the present disclosure. As a result, the angular resolution of a given portion of the captured image 500*c* (measured as a function of an angular distance between the given portion of the captured image 500*c* and a centre of the captured image 500*c*) would vary differently in different directions.

FIGS. 5A, 5B and 5C are merely examples, which should not unduly limit the scope of the claims herein. A person skilled in the art will recognize many variations, alternatives, and modifications of embodiments of the present disclosure. For example, there can be more than one intermediary portion in some implementations.

Figure 6A:
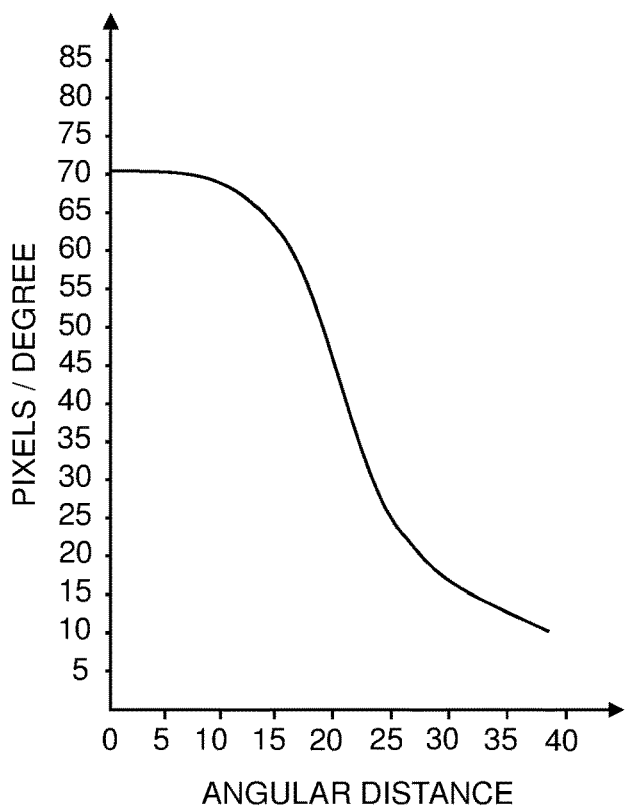
FIG. 6A is an example graphical representation of an angular resolution of a portion of an image as a function of an angular distance between the portion of the image and a centre of the image, the image having a variable angular resolution, in accordance with an embodiment of the present disclosure.

Referring to FIG. 6A, illustrated is an example graphical representation of an angular resolution of a portion of an image as a function of an angular distance between the portion of the image and a centre of the image, in accordance with an embodiment of the present disclosure. The image is captured using at least one optical element having different portions with different optical properties with respect to magnification. Optionally, with reference to FIG. 6A, the at least one optical element behaves in a manner that is similar to a panomorph lens.

As described earlier, the angular resolution is defined as the number of pixels per degree of an angular width of the field of view of the at least one optical element. As shown, the angular resolution is the maximum near the centre of the image, and decreases non-linearly on going from the centre towards an edge of the image. In other words, the angular resolution of a first portion (namely, a portion spanning approximately zero to 30 degrees of the field of view) of the captured image is much greater than the angular resolution of a second portion (namely, a portion spanning approximately 30 to 80 degrees of the field of view) of the captured image.

Figure 6B:
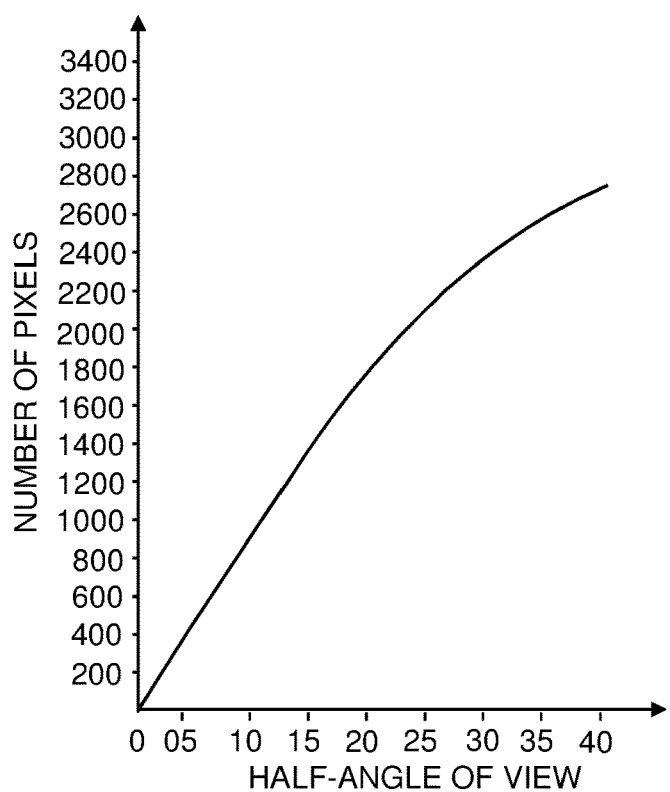
FIG. 6B is an example graphical representation of the number of pixels employed for capturing a half-angle of view as a function of the half-angle of view, in accordance with an embodiment of the present disclosure.

Referring to FIG. 6B, illustrated is an example graphical representation of the number of pixels employed for capturing a half-angle of view as a function of the half-angle of view; in accordance with an embodiment of the present disclosure. As shown, there is a steep increase in the number of pixels from zero degree to approximately 15 degrees of the half-angle of view, after which there is only a gradual increase in the number of pixels.

Figure 6C:
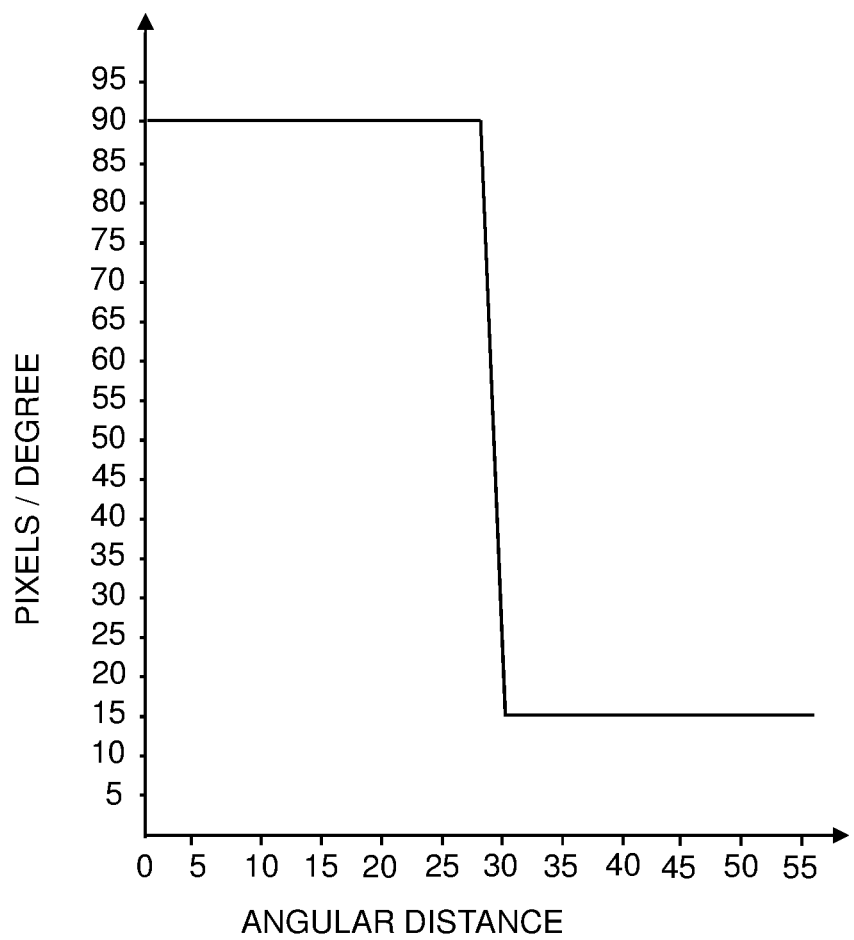
FIG. 6C is another example graphical representation of an angular resolution of a portion of an image as a function of an angular distance between the portion of the image and a centre of the image, the image having a variable angular resolution, in accordance with another embodiment of the present disclosure.

Referring to FIG. 6C, illustrated is another example graphical representation of an angular resolution of a portion of an image as a function of an angular distance between the portion of the image and a centre of the image, in accordance with another embodiment of the present disclosure. The image is captured using at least one optical element having different portions with different optical properties with respect to magnification. Optionally, the at least one optical element comprises a flat lens with optical power only in the first optical-element portion. Alternatively, optionally, the at least one optical element comprises a flat lens with a higher optical power in a portion as compared to a remaining portion of the lens.

As shown, the angular resolution varies in a step-wise manner; the angular resolution of a first portion (namely, a portion spanning approximately zero to 60 degrees of the field of view) of the captured image is much greater than the angular resolution of a second portion (namely, a portion spanning approximately 60 to 110 degrees of the field of view) of the captured image.

Figure 7:
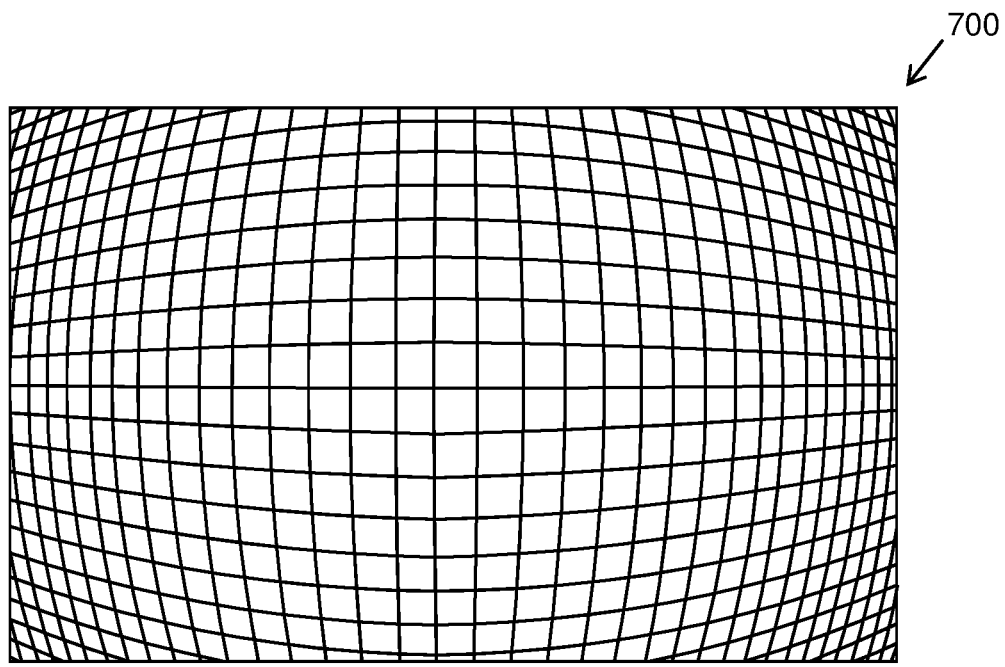
FIG. 7 is an example illustration of an image of a grid of substantially-equispaced vertical and horizontal lines as captured using an imaging unit, in accordance with an embodiment of the present disclosure.

FIG. 7 is an example illustration of an image 700 of a grid of substantially-equispaced vertical and horizontal lines as captured using an imaging unit, in accordance with an embodiment of the present disclosure. As shown, the captured image 700 has a variable angular resolution across its field of view. An angular resolution of a first portion of the captured image 700 is greater than an angular resolution of a second portion of the captured image 700.

Figure 8A:
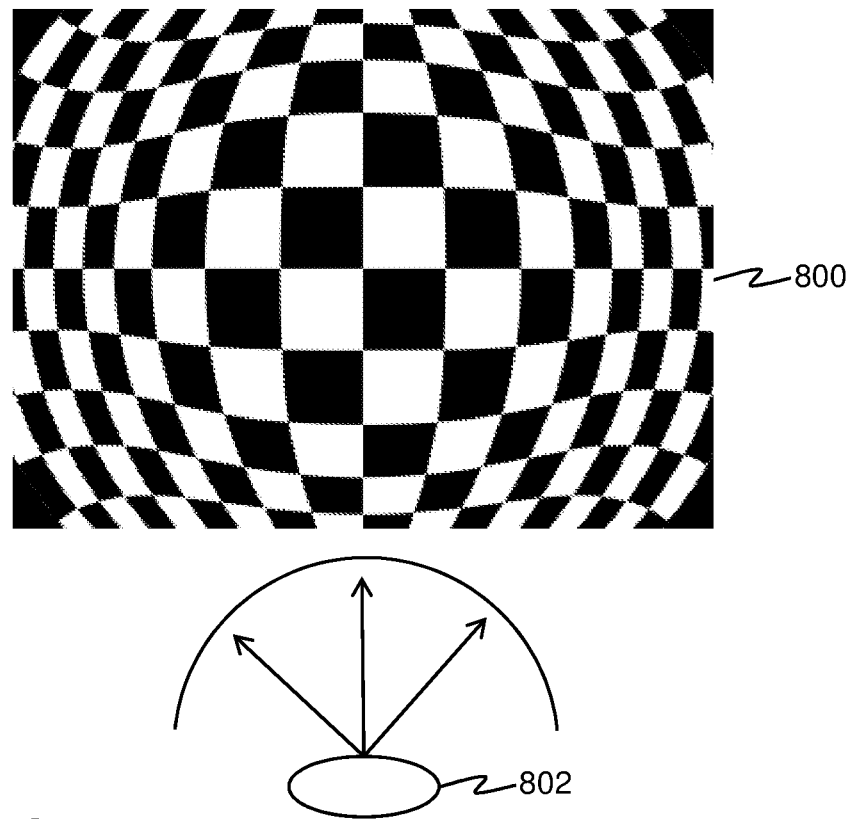
FIG. 8A is an example illustration of an image of an array of black and white squares as captured using an imaging unit having at least one optical element, when said array is placed hemi-spherically around the imaging unit, in accordance with an embodiment of the present disclosure.

FIG. 8A is an example illustration of an image 800 of an array of black and white squares as captured using an imaging unit having an optical element 802, when said array is placed hemi-spherically around the imaging unit, in accordance with an embodiment of the present disclosure. The array of black and white squares is placed in a manner that all squares are equidistant from the optical element 802. It will be appreciated that, in the captured image 800, each of the black and white squares have a same angular width (in degrees) as measured from an optical centre of the optical element 802. Squares near an optical axis of the optical element 802 are bigger than other squares.

Figure 8B:
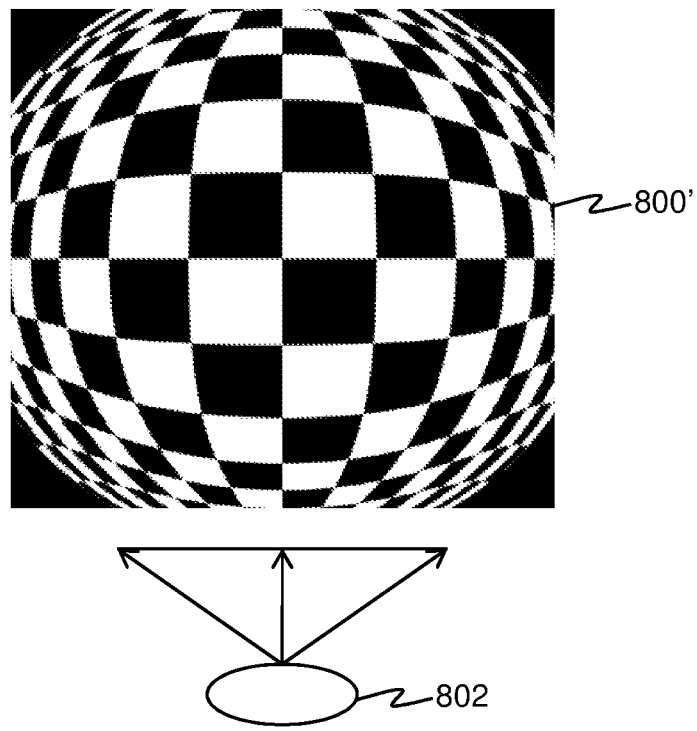
FIG. 8B is another example illustration of an image of a similar array of black and white squares as captured using the imaging unit, when said array is placed on a two-dimensional plane in front of the imaging unit, in accordance with an embodiment of the present disclosure.

FIG. 8B is another example illustration of an image 800' of a similar array of black and white squares as captured using the imaging unit having the optical element 802, when said array is placed on a two-dimensional plane in front of the imaging unit, in accordance with another embodiment of the present disclosure. The array of black and white squares is placed in a manner that squares at a central portion of the captured image 800' are closer to the optical element 802 as compared to squares at edges. As shown, the squares at the central portion appear much larger than the squares at the edges.

Optionally, with reference to FIGS. 8A and 8B, the optical element 802 behaves in a manner that is similar to a panomorph lens.

FIG. 9 is a schematic illustration of how a captured image can be cropped to generate an output image for display via an image renderer of a display apparatus, in accordance with an embodiment of the present disclosure. In FIG. 9, there is shown an optical element 902 through which a projection of a given real-world scene passes or reflects towards a camera chip, which then captures an image 904 of the given real-world scene. An optical axis of the optical element 902 is denoted by a dashed line C-C', while a centre of the captured image 904 is denoted by 'D'.

In a first example case where a user's gaze is directed substantially along the optical axis C-C' of the optical element 902, the captured image 904 is cropped to generate an output image 906 according to a displayable field of view of the image renderer. The displayable field of view is depicted by rays A and B in FIG. 9. As shown, pixel values that are read out to generate the output image 906 are symmetrically distributed about the optical axis C-C'.

In a second example case where a user's gaze shifts towards the left by an angle of 'Z' degrees from the optical axis C-C' of the optical element 902 (which is detected by means for detecting the gaze direction of the display apparatus), the captured image 904 is cropped to generate an output image 908. As shown, pixel values that are read out to generate the output image 908 are not symmetrically distributed about the optical axis C-C', but towards the right by 'Z' degrees as measured from the optical centre of the optical element 902 (namely, with respect to the optical axis of C-C' the optical element 902).

It will be appreciated that the field of view of the optical element 902 is larger than that depicted in FIG. 9; however, only a desired portion of the captured image 904 that is to be cropped (namely, read out) is depicted herein, for the sake of clarity only. FIG. 9 is merely an example, which should not unduly limit the scope of the claims herein. A person skilled in the art will recognize many variations, alternatives, and modifications of embodiments of the present disclosure. For example, when the user's gaze shifts towards the top or the bottom, cropping would be performed accordingly. Moreover, it will be appreciated that the optical element 902 has been depicted as a lens, for the sake of convenience only; the optical element 902 is not limited to a particular type of optical element. In other words, the optical element 902 can be implemented as a single lens or mirror having a complex shape or as a configuration of lenses and/or mirrors.

Figure 10A:
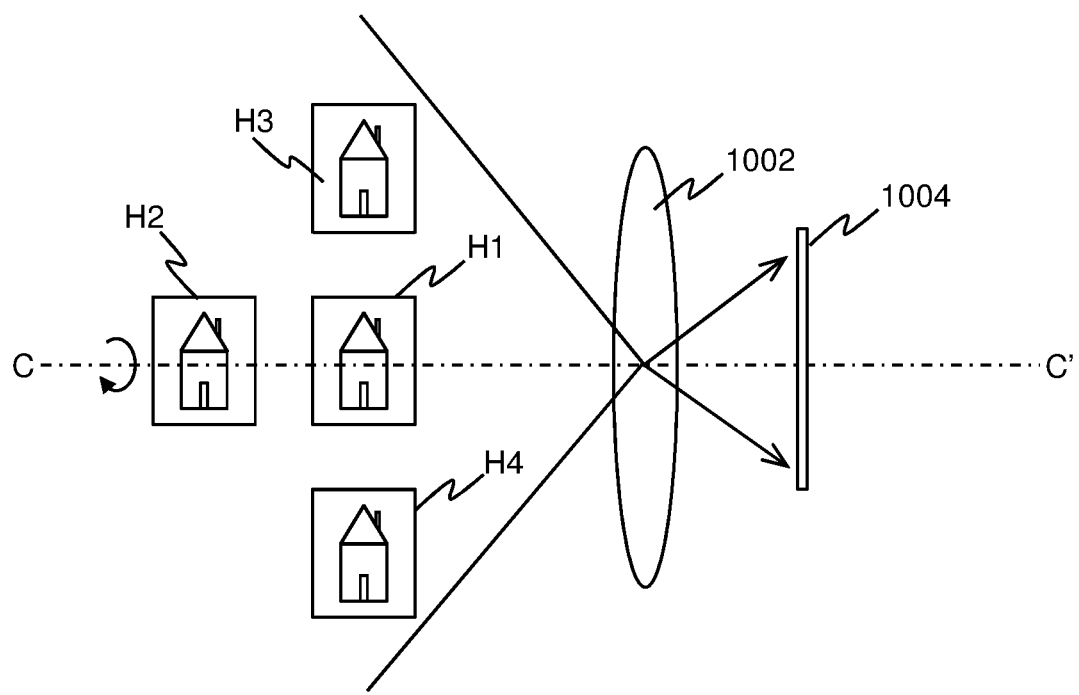
FIGS. 10A and 10B collectively are a schematic illustration of an example implementation where an optical element is rotated with respect to a camera, in accordance with an embodiment of the present disclosure.
Figure 10B:
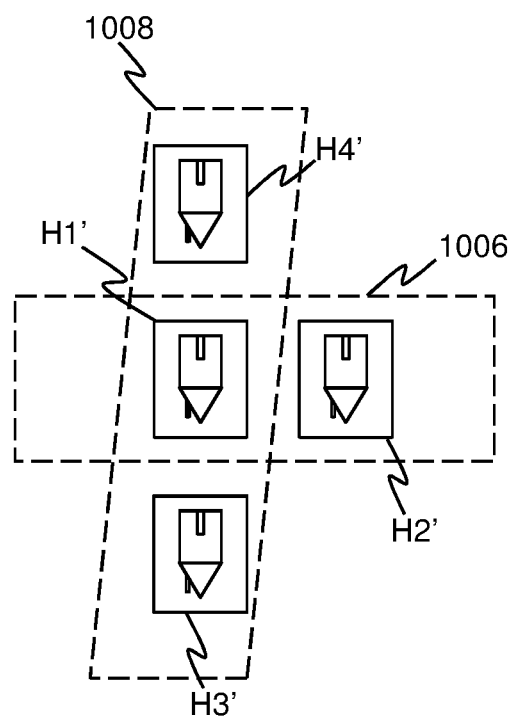

FIGS. 10A and 10B collectively are a schematic illustration of an example implementation where an optical element 1002 is rotated with respect to a camera, in accordance with an embodiment of the present disclosure. In the example implementation, the optical element 1002 is symmetrical about its optical axis and a first optical-element portion is substantially ellipsoidal in shape.

With reference to FIGS. 10A and 10B, a projection of a given real-world scene passes through or reflects from the optical element 1002 towards a camera chip 1004 of the camera, which then captures an image 1006 of the given real-world scene when the optical element 1002 is at a first position. The given real-world scene shows four houses, depicted as houses H1, H2, H3, and H4, whose captured images are depicted as H1', H2', H3' and H4', respectively.

When the optical element 1002 is at the first position, the first optical-element portion of the optical element 1002 captures the images H1' and H2' with a greater angular resolution as compared to a second optical-element portion of the optical element 1002 that captures the images H3' and H4'.

When it is detected that the user's gaze has shifted towards the house H3, the optical element 1002 is rotated along its optical axis C-C' and brought to a second position. In the second position, an image 1008 of the given real-world scene is captured. In such a case, the first optical-element portion of the optical element 1002 captures the images H1', H3' and H4' with a greater angular resolution as compared to the second optical-element portion of the optical element 1002 that captures the image H2'.

Figure 11A:
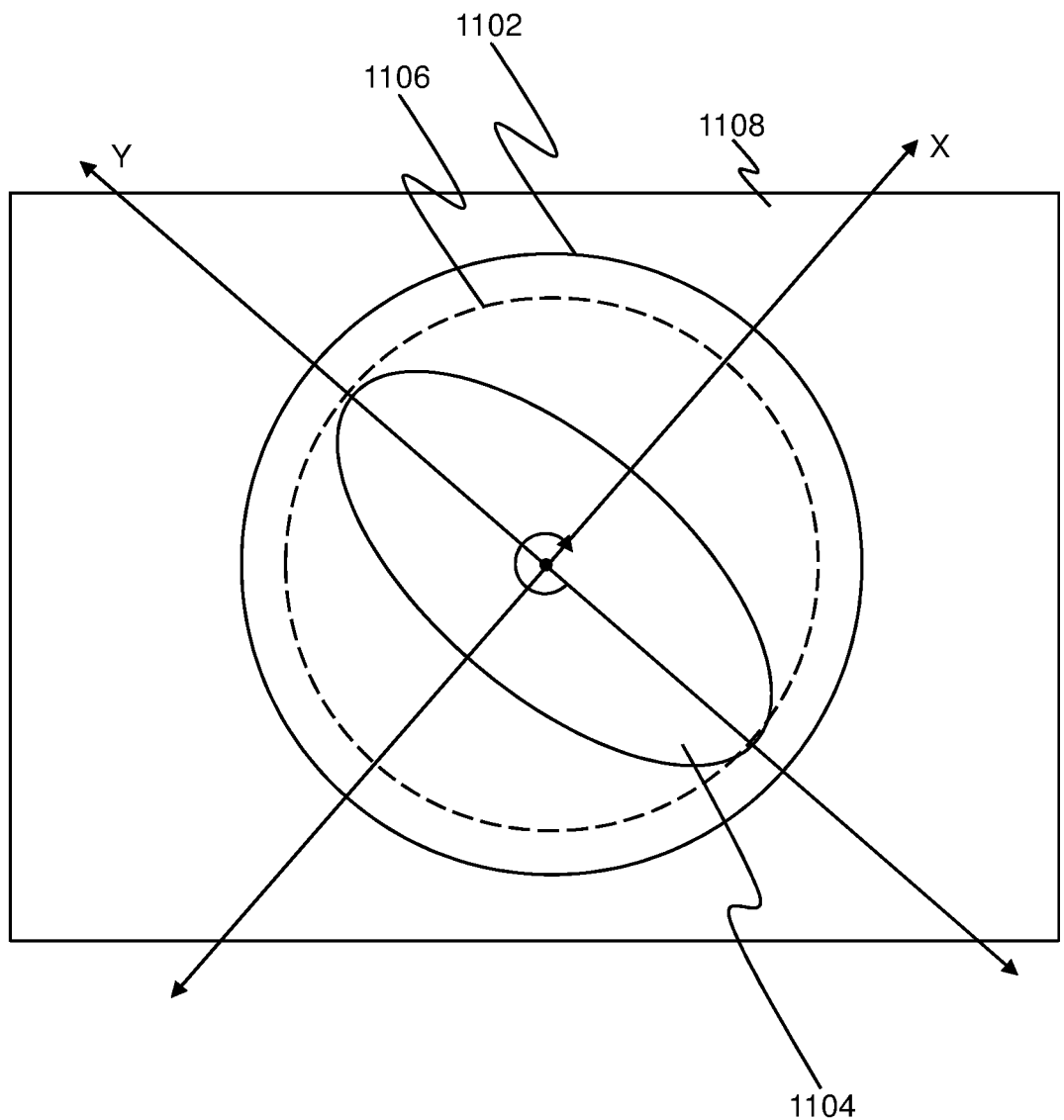
Figure 11B:
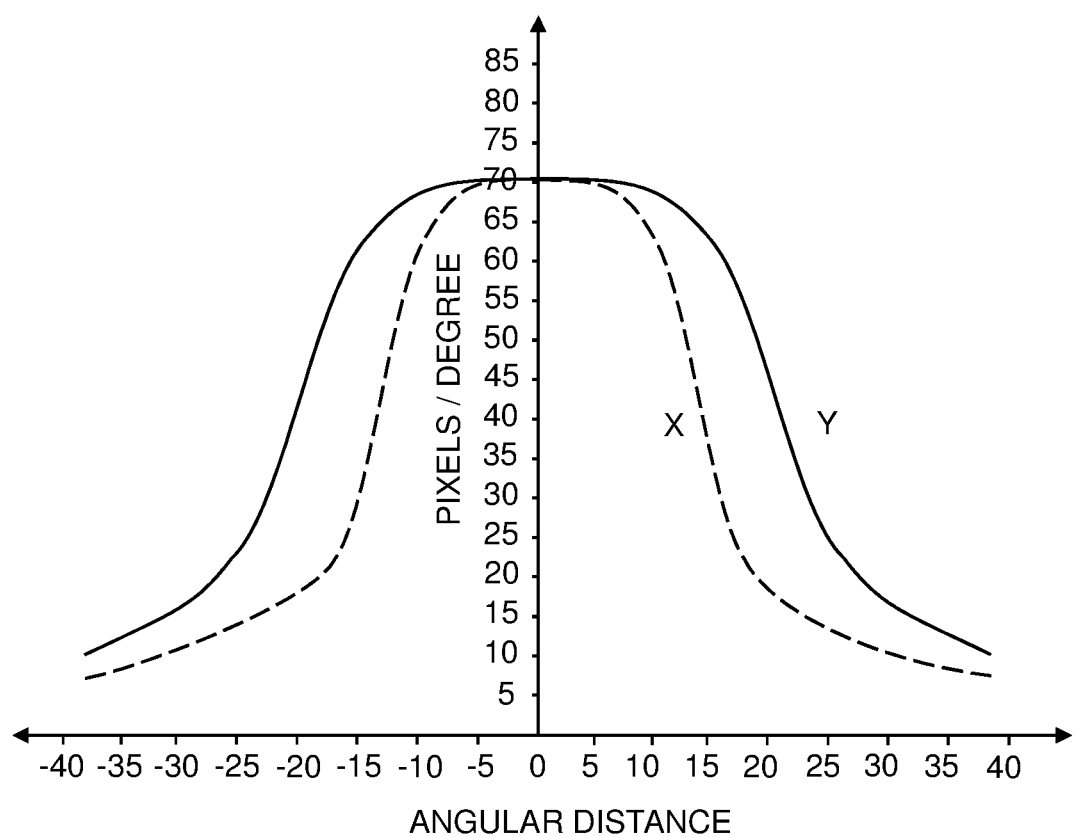
FIG. 11B is an example graphical representation of an angular resolution of a portion of an image as a function of an angular distance between the portion of the image and a centre of the image, the image being captured using the symmetrical optical element, in accordance with an embodiment of the present disclosure.

FIG. 11A is a schematic illustration of an example implementation where a symmetrical optical element 1102 is rotated with respect to a camera, while FIG. 11B is an example graphical representation of an angular resolution of a portion of an image as a function of an angular distance between the portion of the image and a centre of the image, the image being captured using the symmetrical optical element 1102, in accordance with an embodiment of the present disclosure. In this example implementation, the optical element 1102 is symmetrical about its optical axis and a first optical-element portion 1104 is substantially ellipsoidal in shape.

In FIG. 11A, there is shown an optical centre (depicted by a black dot) of the first optical-element portion 1104, which is also a centre of rotation. Two lines representing X and Y directions pass through the centre of rotation, which overlaps with the centre of the image. The optical element 1102 is rotated (namely, about the centre of rotation) to cover a circular area 1106 on a camera chip 1108 using the first optical-element portion 1104.

The optical element 1102 is rotated to a given position, and the rotation is stopped when the first optical-element portion 1104 is aligned according to the detected gaze direction. In this way, the optical element 1102 is rotated repeatedly, based upon the detected gaze direction.

When moving from a first position to a second position (namely, with respect to a change in the user's gaze direction), the optical element 1102 is required to be rotated at an angle that lies in:
- a range of 0 degrees to 180 degrees, when the optical element 1102 rotates in only one direction, or
- a range of 0 degrees to 90 degrees, when the optical element 1102 rotates in both directions.

As shown in FIG. 11B, the angular resolution is the maximum near the centre of the image, and decreases non-linearly on going from the centre towards an edge of the image. The angular resolution of a portion of the image that spans approximately from −10 degrees to +10 degrees of a field of view along the X-direction and from −20 degrees to +20 degrees of the field of view along the Y-direction is much greater than the angular resolution of a remaining portion of the image.

Figure 12A:
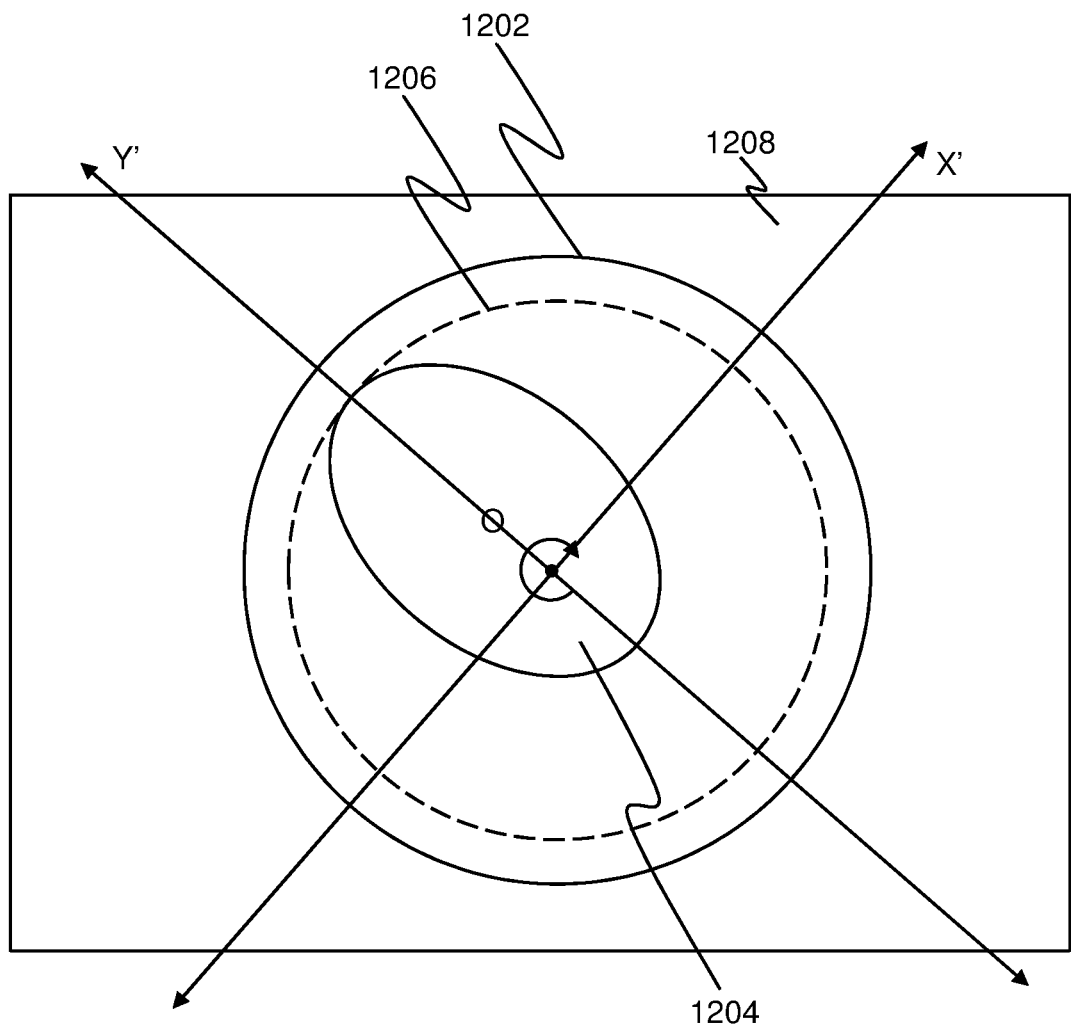
Figure 12B:
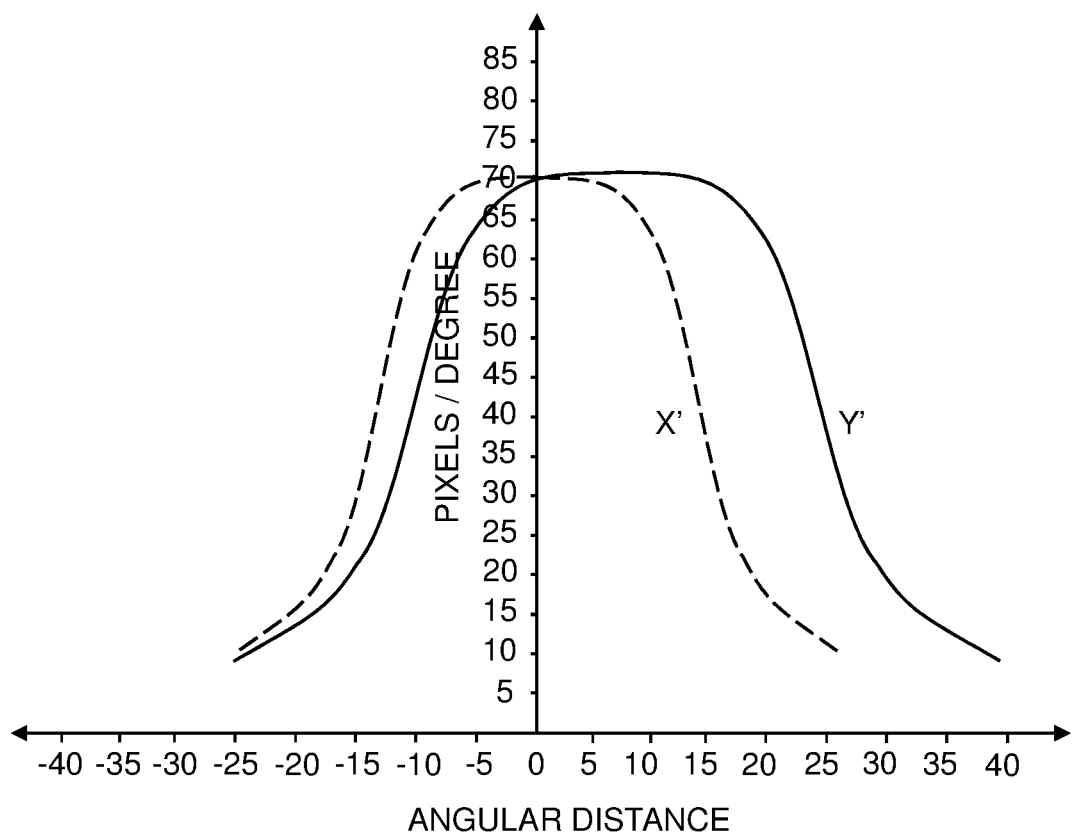
FIG. 12B is an example graphical representation of an angular resolution of a portion of an image as a function of an angular distance between the portion of the image and a centre of the image, the image being captured using the asymmetrical optical element, in accordance with another embodiment of the present disclosure.

FIG. 12A is a schematic illustration of another example implementation where an asymmetrical optical element 1202 is rotated with respect to a camera, while FIG. 12B is an example graphical representation of an angular resolution of a portion of an image as a function of an angular distance between the portion of the image and a centre of the image, the image being captured using the asymmetrical optical element 1202, in accordance with another embodiment of the present disclosure. In this example implementation, the optical element 1202 is asymmetrical about its optical axis and a first optical-element portion 1204 is substantially ellipsoidal in shape.

In FIG. 12A, there are shown an optical centre 'O' of the first optical-element portion 1204 and a centre of rotation (depicted by a black dot). Two lines representing X' and Y' directions pass through the centre of rotation, which overlaps with the centre of the image. As the optical centre 'O' of the first optical-element portion 1204 is not the same as the centre of rotation, the optical element 1202 is rotated (namely, about the centre of rotation) to cover a circular area 1206 on a camera chip 1208 using the first optical-element portion 1204.

The optical element 1202 is rotated to a given position, and the rotation is stopped when the first optical-element portion 1204 is aligned according to the detected gaze direction. In this way, the optical element 1202 is rotated repeatedly, based upon the detected gaze direction.

When moving from a first position to a second position (namely, with respect to a change in the user's gaze direction), the optical element 1202 is required to be rotated at an angle that lies in:
- a range of 0 degrees to 360 degrees, when the optical element 1202 rotates in only one direction, or
- a range of 0 degrees to 180 degrees, when the optical element 1202 rotates in both directions.

As shown in FIG. 12B, the angular resolution of a portion of the image that spans approximately from −10 degrees to +10 degrees of a field of view along the X'-direction and from −5 degrees to +25 degrees of the field of view along the Y'-direction is much greater than the angular resolution of a remaining portion of the image.

FIGS. 10A, 10B, 11A, 11B, 12A and 12B are merely examples, which should not unduly limit the scope of the claims herein. A person skilled in the art will recognize many variations, alternatives, and modifications of embodiments of the present disclosure. It will be appreciated that the optical elements 1002, 1102 and 1202 have been depicted as lenses, for the sake of convenience only; the optical elements 1002, 1102 and 1202 are not limited to a particular type of optical element. In other words, the optical elements 1002, 1102 and 1202 can be implemented as a single lens or mirror having a complex shape or as a configuration of lenses and/or mirrors.

Referring to FIGS. 13A and 13B, illustrated are example arrangements of various components of an imaging unit, in accordance with different embodiments of the present disclosure. The imaging unit comprises at least one optical element, depicted as optical elements 1302, 1304, 1306 and 1308, and a camera comprising a camera chip 1310.

With reference to FIG. 13A, the imaging unit is implemented as a single-axis arrangement, wherein the optical elements 1302, 1304, 1306 and 1308 are aligned along a single optical axis, such that a projection of a given real-world scene passes through the optical elements 1302, 1304, 1306 and 1308 to be incident upon the camera chip 1310.

With reference to FIG. 13B, the imaging system is implemented as a folded arrangement. As shown, the at least one optical element further comprises a reflective element 1312 (depicted as a prism) between the optical elements 1304 and 1306. The reflective element 1312 reflects the projection passing through the optical element 1304 towards the optical element 1306.

Figure 14:
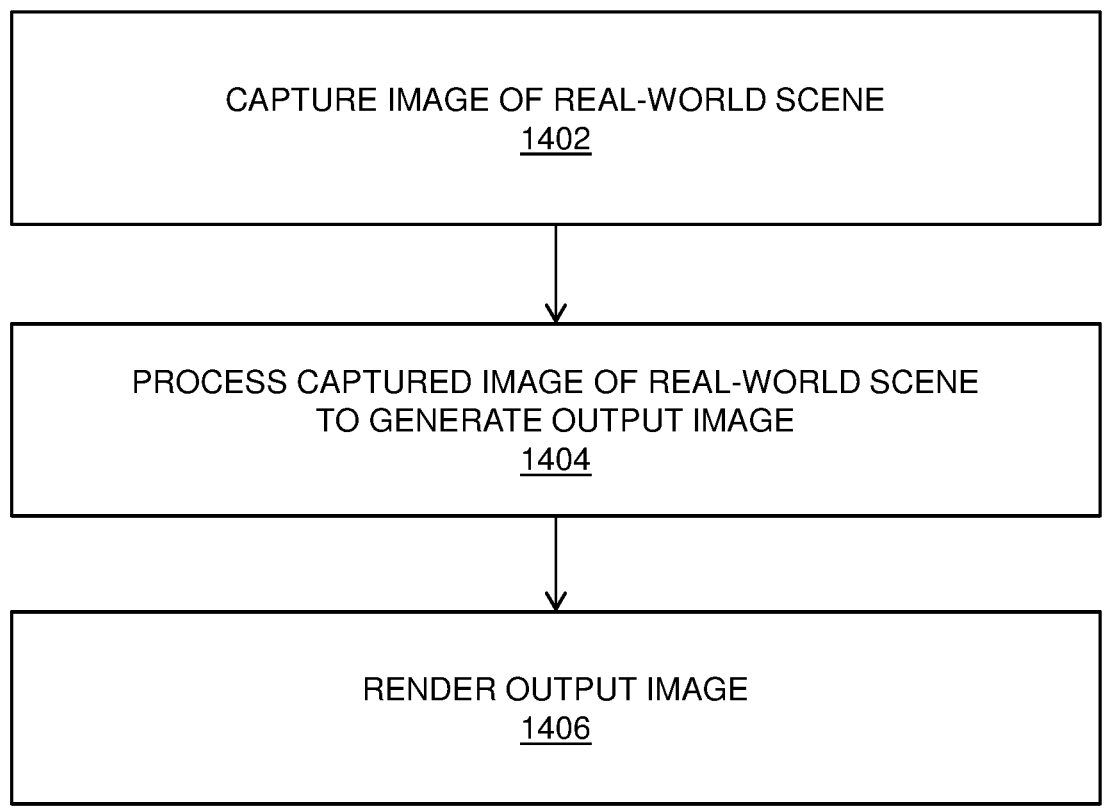
FIG. 14 is a flow chart depicting steps of a method of displaying, in accordance with an embodiment of the present disclosure.

Referring next to FIG. 14, there is provided a flow chart depicting steps of a method of displaying, via a display apparatus. The method is depicted as a collection of steps in a logical flow diagram, which represents a sequence of steps that can be implemented in hardware, software, or a combination thereof, for example as aforementioned.

The display apparatus comprises an imaging unit and at least one image renderer, wherein the imaging unit comprises at least one optical element and at least one camera. The at least one optical element comprises a first optical-element portion and a second optical-element portion having different optical properties with respect to magnification.

At a step 1402, an image of a given real-world scene is captured via at least one camera. A projection of the given real-world scene is differently magnified by the first optical-element portion and the second optical-element portion in a manner that the image captured by the at least one camera has a variable angular resolution across a field of view of at least one optical element. An angular resolution of a first portion of the captured image is greater than an angular resolution of a second portion of the captured image.

At a step 1404, the captured image of the given real-world scene is processed to generate an output image.

At a step 1406, the output image is rendered via the at least one image renderer.

The steps 1402 to 1406 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   an imaging unit comprising:
   at least one camera, the at least one camera is to be used to capture an image of a given real-world scene; and
   at least one optical element arranged on an optical path of a projection of the given real-world scene, wherein the at least one optical element comprises a first optical-element portion and a second optical-element portion having different optical properties with respect to magnification, wherein the projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image;
   at least one image renderer; and
   a processor coupled to the at least one camera and the at least one image renderer, wherein the processor is configured to:
   process the captured image of the given real-world scene to generate an output image; and
   render the output image via the at least one image renderer, wherein a shape of the first optical-element portion and a shape of the second optical-element portion are based on an aspect ratio of the output image.

2. The display apparatus of claim 1, wherein the at least one optical element is asymmetrical with respect to its optical axis, the first optical-element portion and the second optical-element portion being positioned asymmetrically with respect to the optical axis of the at least one optical element.

3. The display apparatus of claim 1, wherein the at least one optical element is symmetrical with respect to its optical axis, the first optical-element portion substantially surrounding an optical centre of the at least one optical element, the second optical-element portion substantially surrounding the first optical-element portion.

4. The display apparatus of claim 1, wherein the angular resolution of the first portion of the captured image is greater than or equal to twice the angular resolution of the second portion of the captured image.

5. The display apparatus of claim 1, wherein magnification power of the first and second optical-element portions of the at least one optical element is to vary from an optical centre of the first optical-element portion towards an edge of the at least one optical element according to a spatial transfer function.

6. The display apparatus of claim 1, wherein the at least one optical element further comprises at least one intermediary optical-element portion between the first optical-element portion and the second optical-element portion, the at least one intermediary optical-element portion having different optical properties with respect to magnification as compared to the first optical-element portion and the second optical-element portion.

7. The display apparatus of claim 1, wherein the first optical-element portion and/or the second optical-element portion have a substantially spherical shape or a substantially ellipsoidal shape.

8. The display apparatus of claim 1, wherein the at least one camera comprises a camera chip, wherein a first region of the given real-world scene is projected by the first optical-element portion onto the camera chip to form the first portion of the captured image, a second region of the given real-world scene is projected by the second optical-element portion onto the camera chip to form the second portion of the captured image, an angular width of the first region of the given real-world scene lying in a range of 5 degrees to 60 degrees, while an angular width of the second region of the given real-world scene lying in a range of 40 degrees to 220 degrees.

9. The display apparatus of claim 1, wherein the captured image appears warped, wherein, when processing the captured image, the processor is configured to de-warp the captured image to generate the output image, the output image so generated having a variable image resolution.

10. The display apparatus of claim 1, wherein the output image appears warped, wherein the display apparatus further comprises at least one complimentary optical element arranged on an optical path of the rendered output image to optically de-warp the output image.

11. The display apparatus of claim 1, wherein the imaging unit further comprises at least one secondary camera coupled to the processor, wherein the at least one secondary camera is to be used to capture a secondary image of the given real-world scene, and wherein the processor is configured to process the secondary image along with the captured image to generate the output image, the secondary image being used to blend a boundary region between the first and second portions of the captured image.

12. The display apparatus of claim 1, further comprising means for detecting a gaze direction of a user, wherein the gaze direction is to be detected when the display apparatus in operation is worn by the user, and wherein, when processing the captured image, the processor is configured to crop the captured image, based upon the detected gaze direction, to generate the output image.

13. The display apparatus of claim 1, further comprising:
    means for detecting a gaze direction of a user, wherein the gaze direction is to be detected when the display apparatus in operation is worn by the user; and
    at least one first actuator attached to the imaging unit, wherein the processor is configured to control the at least one first actuator to adjust an orientation of the imaging unit, based upon the detected gaze direction.

14. The display apparatus of claim 1, further comprising means for detecting a gaze direction of a user, wherein the gaze direction is to be detected when the display apparatus in operation is worn by the user, and wherein the imaging unit further comprises at least one second actuator attached to the at least one optical element, wherein the processor is configured to control the at least one second actuator to rotate the at least one optical element with respect to the at least one camera, based upon the detected gaze direction.

15. An imaging unit comprising:
    at least one camera, the at least one camera is to be used to capture an image of a given real-world scene; and
    at least one optical element arranged on an optical path of a projection of the given real-world scene, wherein the at least one optical element comprises a first optical-element portion and a second optical-element portion having different optical properties with respect to magnification,
    wherein the projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image,
    wherein a shape of the first optical-element portion and a shape of the second optical-element portion are based on an aspect ratio of an output image rendered from the captured image.

16. The imaging unit of claim 15, wherein the at least one optical element is asymmetrical with respect to its optical axis, the first optical-element portion and the second optical-element portion being positioned asymmetrically with respect to the optical axis of the at least one optical element.

17. The imaging unit of claim 15, wherein the at least one optical element is symmetrical with respect to its optical axis, the first optical-element portion substantially surrounding an optical centre of the at least one optical element, the second optical-element portion substantially surrounding the first optical-element portion.

18. The imaging unit of claim 15, wherein the angular resolution of the first portion of the captured image is greater than or equal to twice the angular resolution of the second portion of the captured image.

19. The imaging unit of claim 15, wherein magnification power of the first and second optical-element portions of the at least one optical element is to vary from an optical centre of the first optical-element portion towards an edge of the at least one optical element according to a spatial transfer function.

20. The imaging unit of claim 15, wherein the at least one optical element further comprises at least one intermediary optical-element portion between the first optical-element portion and the second optical-element portion, the at least one intermediary optical-element portion having different optical properties with respect to magnification as compared to the first optical-element portion and the second optical-element portion.

21. The imaging unit of claim 15, wherein the first optical-element portion and/or the second optical-element portion have a substantially spherical shape or a substantially ellipsoidal shape.

22. The imaging unit of claim 15, wherein the at least one camera comprises a camera chip, wherein a first region of the given real-world scene is projected by the first optical-element portion onto the camera chip to form the first portion of the captured image, a second region of the given real-world scene is projected by the second optical-element portion onto the camera chip to form the second portion of the captured image, an angular width of the first region of the given real-world scene lying in a range of 5 degrees to 60 degrees, while an angular width of the second region of the given real-world scene lying in a range of 40 degrees to 220 degrees.

23. A method of displaying, via a display apparatus comprising an imaging unit and at least one image renderer, the imaging unit comprising at least one camera and at least one optical element, the at least one optical element comprising a first optical-element portion and a second optical-element portion having different optical properties with respect to magnification, the method comprising:
    capturing, via the at least one camera, an image of a given real-world scene, wherein a projection of the given real-world scene is differently magnified by the first optical-element portion and the second optical-element portion in a manner that the image captured by the at least one camera has a variable angular resolution across a field of view of the at least one optical element, an angular resolution of a first portion of the captured image being greater than an angular resolution of a second portion of the captured image;
    processing the captured image of the given real-world scene to generate an output image; and
    rendering the output image via the at least one image renderer, wherein a shape of the first optical-element portion and a shape of the second optical-element portion are based on an aspect ratio of the output image.

24. The method of claim 23, wherein the captured image appears warped, wherein the step of processing of the captured image comprises de-warping the captured image to generate the output image, the output image so generated having a variable image resolution.

25. The method of claim 23, wherein the output image appears warped, wherein the display apparatus further comprises at least one complimentary optical element arranged on an optical path of the rendered output image to optically de-warp the output image.

26. The method of claim 23, wherein the imaging unit further comprises at least one secondary camera, and wherein the method further comprises:
    capturing, via the at least one secondary camera, a secondary image of the given real-world scene; and
    processing the secondary image along with the captured image to generate the output image, the secondary image being used to blend a boundary region between the first and second portions of the captured image.

27. The method of claim 23, wherein the display apparatus further comprises means for detecting a gaze direction of a user, the gaze direction being detected when the display apparatus in operation is worn by the user, and wherein the step of processing the captured image comprises cropping the captured image, based upon the detected gaze direction, to generate the output image.

28. The method of claim 23, wherein the display apparatus further comprises means for detecting a gaze direction of a user, the gaze direction being detected when the display apparatus in operation is worn by the user, and at least one first actuator attached to the imaging unit, wherein the method further comprises controlling the at least one first actuator to adjust an orientation of the imaging unit, based upon the detected gaze direction.

29. The method of claim 23, wherein the display apparatus further comprises means for detecting a gaze direction of a user, the gaze direction being detected when the display apparatus in operation is worn by the user, and wherein the imaging unit further comprises at least one second actuator attached to the at least one optical element, wherein the method further comprises controlling the at least one second actuator to rotate the at least one optical element with respect to the at least one camera, based upon the detected gaze direction.

* * * * *